(12) United States Patent
Sugimura et al.

(10) Patent No.: US 11,809,939 B2
(45) Date of Patent: Nov. 7, 2023

(54) RFID TAG WITH BOOST ANTENNA, CONDUCTOR PROVIDED WITH RFID TAG WITH BOOST ANTENNA, AND RFID SYSTEM INCLUDING RFID TAG WITH BOOST ANTENNA

(71) Applicant: KYOCERA CORPORATION, Kyoto (JP)

(72) Inventors: Shiro Sugimura, Kanazawa (JP); Shuichi Yamamoto, Kyoto (JP); Takuya Hayashi, Kyoto (JP); Koji Yamashita, Kyoto (JP); Takaaki Sakai, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 63 days.

(21) Appl. No.: 17/440,983

(22) PCT Filed: Mar. 26, 2020

(86) PCT No.: PCT/JP2020/013512
§ 371 (c)(1),
(2) Date: Sep. 20, 2021

(87) PCT Pub. No.: WO2020/203598
PCT Pub. Date: Oct. 8, 2020

(65) Prior Publication Data
US 2022/0058461 A1    Feb. 24, 2022

(30) Foreign Application Priority Data
Mar. 29, 2019   (JP) .................................. 2019-066959

(51) Int. Cl.
G06K 19/077   (2006.01)
G06K 19/07    (2006.01)
H01Q 1/22     (2006.01)

(52) U.S. Cl.
CPC ... *G06K 19/07794* (2013.01); *G06K 19/0723* (2013.01); *G06K 19/07771* (2013.01); *G06K 19/07786* (2013.01); *H01Q 1/2208* (2013.01)

(58) Field of Classification Search
CPC ................................................. G06K 19/07794
See application file for complete search history.

(56) References Cited

U.S. PATENT DOCUMENTS 4,924,237 A    5/1990   Honda et al.
8,851,388 B2  10/2014   Lin
(Continued)

FOREIGN PATENT DOCUMENTS

CN    101814157 A    8/2010
JP    H01-245721 A   9/1989
(Continued)

OTHER PUBLICATIONS

International Search Report issued in Patent Application No. PCT/JP2020/013512 dated Jul. 14, 2020.

Primary Examiner — Rafferty D Kelly
(74) Attorney, Agent, or Firm — Volpe Koenig

(57) ABSTRACT

An RFID tag 300 with a boost antenna includes a boost antenna 100 and an RFID tag 200, wherein the boost antenna 100 includes: a radiation unit 10 which is conductive; a ground unit 30 which faces the radiation unit 10 and is conductive; and a short circuit unit 20 which connects one end of the radiation unit 10 and one end of the ground unit 30, and electrically connecting the radiation unit 10 and the ground unit 30 with each other, and wherein the RFID tag 200 is arranged at a position close to the short circuit unit 20 on the ground unit 30, wherein each of the boost antenna 100 and the RFID tag 200 has resonance characteristics.

19 Claims, 12 Drawing Sheets

(56) References Cited

U.S. PATENT DOCUMENTS

| | | | |
|---|---|---|---|
| 2012/0217310 A1* | 8/2012 | Lin | G06K 19/07794 235/492 |
| 2013/0207852 A1 | 8/2013 | Nakano | |
| 2015/0116168 A1 | 4/2015 | Yosui | |

FOREIGN PATENT DOCUMENTS

| | | |
|---|---|---|
| JP | H11-68449 A | 3/1999 |
| JP | 2008-226099 A | 9/2008 |
| JP | 2010-218537 A | 9/2010 |
| JP | 4892608 B2 | 3/2012 |
| JP | 2012-253699 A | 12/2012 |
| JP | 2013-55637 A | 3/2013 |
| JP | 6360264 B2 | 7/2018 |
| WO | 2014/098024 A1 | 6/2014 |

\* cited by examiner

RFID TAG WITH BOOST ANTENNA, CONDUCTOR PROVIDED WITH RFID TAG WITH BOOST ANTENNA, AND RFID SYSTEM INCLUDING RFID TAG WITH BOOST ANTENNA

TECHNICAL FIELD

The present disclosure relates to an RFID tag with a boost antenna, a conductor provided with an RFID tag with a boost antenna, and an RFID system including an RFID tag with a boost antenna.

BACKGROUND

In recent years, small RFID tags are used in various fields of physical distribution or the like. However, since the small RFID tags are inferior in communication characteristics, there is a demand for improvement in communication distances in the small RFID tags.

Patent Literature 1 (Japanese Patent Laid-Open No. 1999-68449) discloses an inverted F type built-in antenna for radio including: a grounding conductor plate provided inside a resin cover of a radio that covers a case in which a radio circuit is stored, and fixed to an opening portion of the case; a radiation conductor plate disposed parallel to the grounding conductor plate at a predetermined distance from the cover, with one side folded at a right angle and fixed to the grounding conductor plate; and a power feeder connected to a side edge portion of the radiation conductor plate, in which at least one linear non-feeding antenna element having a length of ½ or less of a wavelength of a transmission/reception radio wave of the radio is fixed in parallel near the radiation conductor plate inside the cover, and antenna gain is increased by inductive coupling with the radiation conductor plate.

Patent Literature 2 (Japanese Patent No. 4892608) discloses a surface independent EM tag, including: an electromagnetic radiation decoupler having a cavity structure including a conductive base part connected to a first conductive side wall and a second conductive side wall, in which the first conductive side wall and the second conductive side wall are spaced apart and substantially parallel; an electronic apparatus, which is the EM tag including an antenna integrated with a chip is provided and the EM tag is attached near an opening end of the cavity structure.

Patent Literature 3 (U.S. Pat. No. 8,851,388) discloses an RFID tag including: a grounding casing made from a conductive material; a coupling casing made from the conductive material and disposed opposite to the grounding casing including a coupling part and a covering part; and an RFID module including an RFID chip and a coupling member electrically coupled with the RFID chip, in which detection sensitivity of the RFID tag is increased and the length of one end short circuit state of said coupling casing is a quarter wavelength.

Patent Literature 4 (Japanese Patent No. 6360264) describes an RFID tag substrate including: an insulating substrate including a top surface and an undersurface including a concave portion; a top surface conductor provided on the top surface of the insulating substrate; a grounding conductor provided on the undersurface of the insulating substrate and electrically connected to the top surface conductor via a short circuit part through conductor that penetrates the insulating substrate in a thickness direction; a capacity part conductor provided inside the insulating substrate and facing part of the top surface conductor; a capacity part penetrating conductor provided so as to penetrate the insulating substrate from the capacity part conductor to the grounding conductor in the thickness direction; a first electrode provided in the concave portion and electrically connected to the capacity part conductor or the grounding conductor via the first connection conductor; and a second electrode electrically connected to the top surface conductor via a second connection conductor.

CITATION LIST

Patent Literature

Patent Literature 1: Japanese Patent Laid-Open No. 1999-68449
Patent Literature 2: Japanese Patent No. 4892608
Patent Literature 3: U.S. Pat. No. 8,851,388
Patent Literature 4: Japanese Patent No. 6360264

SUMMARY (1)
An RFID tag with a boost antenna according to one aspect is an RFID tag with a boost antenna including a boost antenna and an RFID tag, in which the boost antenna includes: a conductive radiation unit; a conductive ground unit facing the radiation unit; and a short circuit unit that connects one end of the radiation unit and one end of the ground unit, and electrically conducts the radiation unit and the ground unit to each other, the RFID tag is disposed between the radiation unit and the ground unit of the boost antenna and at a position closer to the short circuit unit than to a center position in a longitudinal direction of the radiation unit, and the boost antenna and the RFID tag each have resonance characteristics.

In this case, when the resonator provided in the RFID tag and the resonator provided in the boost antenna are coupled, energy propagates from the RFID tag to the boost antenna efficiently. Furthermore, since a radio wave radiates from the boost antenna providing the inverted-L antenna structure and having high antenna gain, it is possible to improve a communication distance of the RFID tag with a boost antenna compared with the RFID tag as a single unit.

Since the boost antenna and the RFID tag have respective resonance frequencies as single units, and as a result, the RFID tag with a boost antenna also has two resonance frequencies, it is possible to implement a dual-band compatible RFID tag, and a wideband RFID tag by adjusting the two resonance frequencies.

Since the RFID tag is fixed to an object such as a conductor via the boost antenna, heat transfer is weak compared to a case where the RFID tag is directly fixed to the object, and as a result, it is possible to improve heat resistance of the RFID tag.

(2)
An RFID tag with a boost antenna according to a second disclosure is the RFID tag with a boost antenna according to the one aspect, in which the short circuit unit, the radiation unit, and the ground unit may have a same width, and the short circuit unit may have a rectangular parallelepiped shape.

In this case, since the shape of the boost antenna is simple, manufacturing is easy.

(3)
An RFID tag with a boost antenna according to a third disclosure is the RFID tag with a boost antenna according to the one aspect or the second disclosure, in which the radiation unit, the short circuit unit, and the ground unit may be integrated.

In this case, it is possible to easily manufacture the boost antenna using a method such as folding one rectangular metal or applying extrusion processing from an aluminum material.

(4)

An RFID tag with a boost antenna according to a fourth disclosure is the RFID tag with a boost antenna according to the one aspect, in which the short circuit unit may be constructed of at least one post.

In this case, by adjusting the positions of the posts and/or the number of posts of the short circuit unit, it is possible to adjust the resonance frequency of the boost antenna and the coupling coefficient between the boost antenna and the RFID tag when the RFID tag is disposed on the boost antenna, with respect to the boost antenna having the same shape of the radiation unit. Note that the "posts" used in the present disclosure mean struts that connect the radiation unit and the ground unit.

(5)

An RFID tag with a boost antenna according to a fifth disclosure is the RFID tag with a boost antenna according to from the one aspect to the fourth disclosure, in which the ground unit may include a protrusion for positioning the RFID tag.

In this case, it is possible to reduce variations in the position of the RFID tag disposed on the ground unit of the boost antenna, and suppress variations in characteristics such as the resonance frequency of the RFID tag with the boost antenna.

(6)

An RFID tag with a boost antenna according to a sixth disclosure is the RFID tag with a boost antenna according to from the one aspect to the fourth disclosure, in which the ground unit may include a fixing tool to fix the RFID tag.

In this case, since the RFID tag is fixed to the boost antenna with the fixing tool, the RFID tag need not be fixed using an adhesive, and heat resistance of the RFID tag with a boost antenna can be improved.

(7)

An RFID tag with a boost antenna according to a seventh disclosure is the RFID tag with a boost antenna according to from the one aspect to the second disclosure, in which the radiation unit and the short circuit unit are integrated, the ground unit is separate from the radiation unit and the short circuit unit, the RFID tag is mounted on the ground unit, and a connection part provided in the short circuit unit may be connected to the ground unit.

In this case, the RFID tag is mounted on the ground unit first, and the integrated radiation unit and short circuit unit are then connected to the ground unit using the connection part provided in the short circuit unit, and it is thereby possible to improve workability of mounting the RFID tag on the boost antenna.

(8)

An RFID tag with a boost antenna according to an eighth disclosure is the RFID tag with a boost antenna according to the seventh disclosure, in which the connection part and the ground unit may be slidably connected in the longitudinal direction of the ground unit.

In this case, by adjusting the distance between the short circuit unit and the RFID tag, it is possible to adjust the resonance frequency of the RFID tag with a boost antenna, and so even when, for example, the resonance frequency of the RFID tag varies from lot to lot, it is possible to tune the resonance frequency of the RFID tag with a boost antenna to a target frequency.

(9)

An RFID tag with a boost antenna according to a ninth disclosure is the RFID tag with a boost antenna according to the third disclosure, in which the ground unit may include a mounting region of the RFID tag on the inner surface on the side facing the radiation unit, and the radiation unit may include an opening region larger in width and length in a plan view than the mounting region at a position facing the mounting region.

In this case, forming an opening region larger than the mounting region in the radiation unit makes it easier to dispose the RFID tag from the opening region in the ground unit mounting region when mounting the RFID tag on the boost antenna.

(10)

An RFID tag with a boost antenna according to a tenth disclosure is the RFID tag with a boost antenna according to the ninth disclosure, in which the mounting region may be a convex top surface.

In this case, steps at ends of the mounting region make it possible to easily recognize the RFID tag mounting position.

(11)

An RFID tag with a boost antenna according to an eleventh disclosure is the RFID tag with a boost antenna according to the ninth or tenth disclosure, in which the ground unit may include a first groove around the mounting region.

In this case, the first groove makes it possible to easily recognize the RFID tag mounting position.

Applying an adhesive to the mounting region and the first groove therearound can improve bonding strength between the RFID tag and the ground unit.

(12)

An RFID tag with a boost antenna according to a twelfth disclosure is the RFID tag with a boost antenna according to the third or ninth disclosure, in which a space formed between the radiation unit and the ground unit on which the RFID tag is mounted may be filled with resin.

In this case, adhesive strength of the resin allows the RFID tag to be fixed to the boost antenna more strongly. The resin surrounding the RFID tag can protect the RFID tag. When the opening region is formed in the radiation unit, resin penetrates into the opening region, which makes it harder for the resin and the RFID tag to come off the boost antenna.

(13)

An RFID tag with a boost antenna according to a thirteenth disclosure is the RFID tag with a boost antenna according to the twelfth disclosure, further including an opening hole in at least one of the radiation unit and the ground unit, in which resin may penetrate into the opening hole.

In this case, the resin penetrates into the opening hole, which makes it much harder for the resin and the RFID tag to come off the boost antenna.

(14)

An RFID tag with a boost antenna according to a fourteenth disclosure is the RFID tag with a boost antenna according to the third disclosure, in which the ground unit may include a second groove on the inner surface on a side facing the radiation unit, and the second groove may extend from a side surface in a width direction of the ground unit to the mounting region of the RFID tag.

In this case, by sliding the RFID tag along the second groove makes it easy to dispose the RFID tag in the mounting region of the ground unit.

(15)

An RFID tag with a boost antenna according to a fifteenth disclosure is the RFID tag with a boost antenna according to the fourteenth disclosure, further including a third groove that extends from the mounting region in the longitudinal direction of the ground unit.

In this case, by sliding the RFID tag disposed in the mounting region along the third groove in the longitudinal direction of the ground unit, it is possible to adjust the distance between the RFID tag and the short circuit unit and tune the resonance frequency of the RFID tag with a boost antenna to a target frequency.

(16)

An RFID tag with a boost antenna according to a sixteenth disclosure is the RFID tag with a boost antenna according to the third disclosure, further including a separate mounting unit made of a conductive material for mounting the RFID tag, in which the ground unit may further include a through hole which is larger in width and length in a plan view than the RFID tag and a notch located on an outer surface around the through hole, and the mounting unit may engage with the notch.

In this case, by attaching the mounting unit on which the RFID tag is mounted from the outer surface of the ground unit, it is possible to improve workability of mounting the RFID tag on the boost antenna.

(17)

An RFID tag with a boost antenna according to a seventeenth disclosure is the RFID tag with a boost antenna according to the sixteenth disclosure, in which the length of the notch in the longitudinal direction of the ground unit may be longer than the length of the mounting unit.

In this case, in the engagement between the mounting unit and the notch, by sliding the mounting unit in the longitudinal direction of the ground unit, it is possible to adjust the distance between the RFID tag and the short circuit unit and tune the resonance frequency of the RFID tag with a boost antenna to a target.

(18)

An RFID tag with a boost antenna according to an eighteenth disclosure is the RFID tag with a boost antenna according to from the first aspect to the seventeenth disclosure, in which the RFID tag with a boost antenna may be configured to adjust the resonance frequency of the boost antenna, the resonance frequency of the RFID tag, and the coupling coefficient between the boost antenna and the RFID tag to enable transmission/reception at two different frequency bands.

In the RFID tag with a boost antenna, the RFID tag as a single unit and the boost antenna as a single unit are each provided with a resonance frequency. In this case, the RFID tag with a boost antenna is provided with two resonance frequencies different from the resonance frequency of the RFID tag as a single unit and the resonance frequency of the boost antenna as a single unit. The resonance frequency of the RFID tag with a boost antenna changes depending on the resonance frequency of the boost antenna and the resonance frequency of the RFID tag, and a coupling coefficient between the boost antenna and the RFID tag.

Therefore, the RFID tag with a boost antenna can be constructed by adjusting the resonance frequency of the boost antenna and the resonance frequency of the RFID tag and the coupling coefficient between the boost antenna and the RFID tag, and tuning the two resonance frequencies of the RFID tag with a boost antenna to the two necessary transmission/reception frequencies.

Note that the coupling coefficient between the boost antenna and the RFID tag can be adjusted by changing, for example, the distance between the radiation unit and the ground unit of the boost antenna, the shape of the short circuit unit of the boost antenna, the position and/or the direction of the RFID tag disposed in the ground unit of the boost antenna.

(19)

An RFID tag with a boost antenna according to a nineteenth disclosure is the RFID tag with a boost antenna according to from the one aspect to the seventeenth disclosure, in which the RFID tag with a boost antenna may be configured to adjust the resonance frequency of the boost antenna, the resonance frequency of the RFID tag, and the coupling coefficient between the boost antenna and the RFID tag, and widen the transmission/reception frequency band.

For an antenna provided with two resonance frequencies, a wideband antenna can be configured by bringing the two resonance frequencies closer together.

On the other hand, in the disclosure according to the one aspect, the boost antenna and the RFID tag are each provided with resonance characteristics, and the resonator provided in the RFID tag and the resonator provided in the boost antenna are coupled together. In this case, two resonance frequencies can be brought closer together by reducing the coupling coefficient.

Therefore, a wideband antenna can be constructed by adjusting the resonance frequency of the boost antenna and the resonance frequency of the RFID tag, and the coupling coefficient between the boost antenna and the RFID tag.

(20)

An RFID tag with a boost antenna according to a twentieth disclosure is the RFID tag with a boost antenna according to from the one aspect to the nineteenth disclosure, in which an insulating support member may be inserted in a space formed between the radiation unit and the ground unit.

The insulating support member has an effect of stabilizing the distance between the radiation unit and the ground unit.

Using a material of a high relative permittivity as the insulating support member, it is possible to shorten the wavelength of an electromagnetic wave passing through the insulating support member. By shortening the wavelength of the electromagnetic wave, it is possible to reduce the resonance frequency for the boost antenna of the same shape or reduce the shape for the boost antenna of the same resonance frequency.

Furthermore, the above effect also varies depending on the position at which the insulating support member is inserted, and it is better to insert the insulating support member on the other end (opening end) side of the radiation plate and the ground plate.

Therefore, by fixing the shapes of the radiation unit and the ground unit of the boost antenna and adjusting the position of the insulating support member, it is also possible to adjust the resonance frequency.

(21)

An RFID tag with a boost antenna according to a twenty-first disclosure is the RFID tag with a boost antenna according to the twentieth disclosure, in which one end of the insulating support member may contact the short circuit unit and the insulating support member may include at least one pocket for positioning the RFID tag.

In this case, by storing the RFID tag in the pocket of the insulating support member and then inserting the insulating support member into the space of the boost antenna to contact the short circuit unit, it is possible to accurately dispose the RFID tag in the predetermined mounting region. This improves workability of mounting the RFID tag on the boost antenna.

Note that the radiation unit and the ground unit of the boost antenna may be parallel to each other so as to smoothly insert the insulating support member into the space of the boost antenna and so that the insulating support member and the radiation unit, the short circuit unit, and the ground unit of the boost antenna are brought into close contact with each other without gaps.

(22)

An RFID tag with a boost antenna according to a twenty-second disclosure is the RFID tag with a boost antenna according to the twenty-first disclosure, in which the insulating support member may be a frame body and may include a support portion to connect the frame body in the width direction of the ground unit, and the pocket may be provided on the ground unit side of the support portion.

In this case, it is possible to reduce the size of the boost antenna, minimize dielectric loss due to the insulating support member, and protect the tag by the insulating support member, by filling the insulating support member only at the opening end side, the short circuit unit side, the portion facing both ends in the width direction of the ground unit, and around the pocket in which the RFID tag is stored. Filling the insulating support member at the opening end side is better as the dielectric position for miniaturization. Filling the insulating support member at the short circuit unit side is better for positioning the pocket and the RFID tag.

(23)

An RFID tag with a boost antenna according to a twenty-third disclosure is the RFID tag with a boost antenna according to the twenty-first or twenty-second disclosure, in which the insulating support member includes a plurality of pockets having different distances from the short circuit unit and the RFID tag may be stored in one of the plurality of pockets.

In this case, by selecting a pocket in which the RFID tag is stored, it is possible to easily and accurately adjust the distance from the short circuit unit of the RFID tag and tune the resonance frequency of the RFID tag with a boost antenna to a target.

(24)

An RFID tag with a boost antenna according to a twenty-fourth disclosure is the RFID tag with a boost antenna according to the twenty-first or twenty-second disclosure, in which the insulating support member includes a plurality of pockets having different distances from the short circuit unit and a plurality of RFID tags may be stored in the plurality of pockets.

Note that the number of RFID tags stored is equal to or smaller than the number of pockets. For example, when there are three pockets having different distances from the short circuit unit, the RFID tag may be stored in two out of three pockets.

When a plurality of RFID tags are stored in a plurality of pockets having different distances from the short circuit unit, a resonance frequency formed of each RFID tag and each boost antenna differs from each other, and so the RFID tag with a boost antenna can be provided with a plurality of different resonance frequencies and can respond to wider communication frequency bands.

(25)

An RFID tag with a boost antenna according to a twenty-fifth disclosure is the RFID tag with a boost antenna according to the twenty-first or twenty-second disclosure, further including a plurality of pockets, in which a plurality of RFID tags provided with memories may be stored in the plurality of pockets.

Note that the number of RFID tags stored is equal to or smaller than the number of pockets. For example, when there are three pockets, the RFID tag may be stored in two out of three pockets.

In this case, by specifying which RFID tag memory the reader/writer of the RFID tag with a boost antenna should read from, or which RFID tag memory the reader/writer should write to, it is possible to allow the RFID tag with a boost antenna to function as an RFID tag with a large memory capacity summing memories of the plurality of RFID tags.

(26)

An RFID tag with a boost antenna according to a twenty-sixth disclosure is the RFID tag with a boost antenna according to from the one aspect to the twenty-fifth disclosure, in which the RFID tag is an inverted-F antenna type RFID tag, the RFID tag including: an insulating substrate; a radiation plate provided on the top surface of the insulating substrate; a ground plate provided on an undersurface of the insulating substrate; a short circuit conductor connected to the radiation plate and the ground plate; and an IC chip connected to the radiation plate and the ground plate, and the RFID tag may be disposed so that the short circuit conductor is located on a side farthest from the short circuit unit or on a side closest to the short circuit unit.

By using the inverted-F antenna type RFID tag as the RFID tag and disposing the RFID tag on the ground plate of the boost antenna, it is possible to increase directivity in the zenith direction of the RFID tag, and efficiently send an electromagnetic wave radiated from the RFID tag to the radiation unit of the boost antenna.

In the inverted-F antenna type RFID tag, the short circuit conductor is disposed in the vicinity of one side surface of the insulating substrate and side surface facing this one side surface becomes an opening of the RFID tag. By disposing the RFID tag in the above direction, it is possible to match the direction of the electric field and the magnetic field of the RFID tag with the direction of the electric field and the magnetic field of the boost antenna when the boost antenna resonates, and send energy from the RFID tag via the boost antenna more efficiently.

(27)

An RFID tag with a boost antenna according to a twenty-seventh disclosure is the RFID tag with a boost antenna according to the twenty-sixth disclosure, in which the RFID tag may be disposed so that the short circuit conductor is located on the side farthest from the short circuit unit.

In this case, the opening of the RFID tag is directed toward the short circuit unit of the boost antenna. In the boost antenna having an inverted-L structure, the short circuit unit corresponds to a node with the smallest amplitude of the standing wave at resonance. Therefore, the electromagnetic wave can be sent from the RFID tag to the radiation unit more efficiently by disposing the short circuit conductor of the RFID tag on the side farthest from the short circuit unit and disposing the opening of the RFID tag toward the short circuit unit.

(28)

A conductor provided with the RFID tag with a boost antenna according to a twenty-eighth disclosure may be configured to fix the RFID tag with a boost antenna according to from the one aspect to the twenty-seventh disclosure to a surface of the conductor and electrically connect the ground unit of the boost antenna and the surface of the conductor directly or via a capacitance.

In this case, since the conductor becomes an extension of the ground unit of the boost antenna and the RFID tag with a boost antenna substantially operates as the RFID tag with a boost antenna with expanded area of the ground unit of the boost antenna, the communication distance of the RFID tag with a boost antenna can be improved.

When the dipole antenna type RFID tag is fixed to the conductor surface, the communication distance of the RFID tag becomes considerably shorter under the influence of the conductor. However, when the RFID tag with a boost antenna of the present disclosure is fixed to the surface of the conductor, the communication distance can be improved.

(29)

An RFID system including the RFID tag with a boost antenna according to a twenty-ninth disclosure includes the RFID tag with a boost antenna according to from the one aspect to the twenty-seventh disclosure and an RFID reader/writer provided with an antenna that transmits/receives a radio wave to/from the RFID tag with a boost antenna.

In this case, the RFID tag with a boost antenna is mounted on and used for various objects and various information on the objects is written in the RFID tag. The information is rewritable at any time according to information transmitted/received between the RFID reader/writer and the RFID tag with a boost antenna in the RFID system including the RFID tag with a boost antenna.

Since the RFID system can vastly improve the communication distance of the RFID tag with a boost antenna, communication can be carried out even when there is a large distance between the RFID tag with a boost antenna and the RFID reader/writer.

DETAILED DESCRIPTION

An RFID system uses an RFID tag provided with an antenna and an IC chip. An RFID tag receives a radio wave (carrier) transmitted from an antenna of a reading device by an antenna of the RFID tag. The RFID tag sends back identification data or the like of a transported object recorded in the IC chip to an RFID reader/writer on a reflected wave. This allows the RFID tag to communicate with the RFID reader/writer without touching the RFID reader/writer to the RFID tag. Note that some RFID readers/writers have a writing function to write information to the RFID tag.

Recently, there are cases where in a high heat environment such as an automobile manufacturing line, an RFID tag is attached to a vehicle body and the RFID tag is used for management in a manufacturing process. For such an application, a small RFID tag that can be disposed on a metal and has heat resistance is under development.

However, with the small RFID tag, the shape of the antenna is limited, antenna gain decreases, making it difficult to secure a sufficient communication distance, and so it is necessary to improve the communication distance of the heat-resistant small RFID tag.

A standard of transmission/reception frequency of the RFID varies from country to country, and so there is a demand for realization of a dual-band compatible RFID tag which can transmit and receive at two different frequencies and a wideband RFID tag which can transmit and receive in a wide frequency band.

According to the disclosure described in Patent Literature 1, the antenna body is an inverted F antenna and is mounted on metal. By selecting a horizontal distance and a vertical distance between the radiation conductor plate and the linear non-feeding antenna element of the antenna body, improvement on the order of 6 dB to 7 dB has been achieved.

However, in the case of the disclosure described in Patent Literature 1, a separate insulating support instrument or the like is necessary to appropriately fix the horizontal distance and the vertical distance between the radiation conductor plate and the linear non-feeding antenna element of the antenna body, which results in that the structure of the boost antenna becomes complicated.

Figure 4:
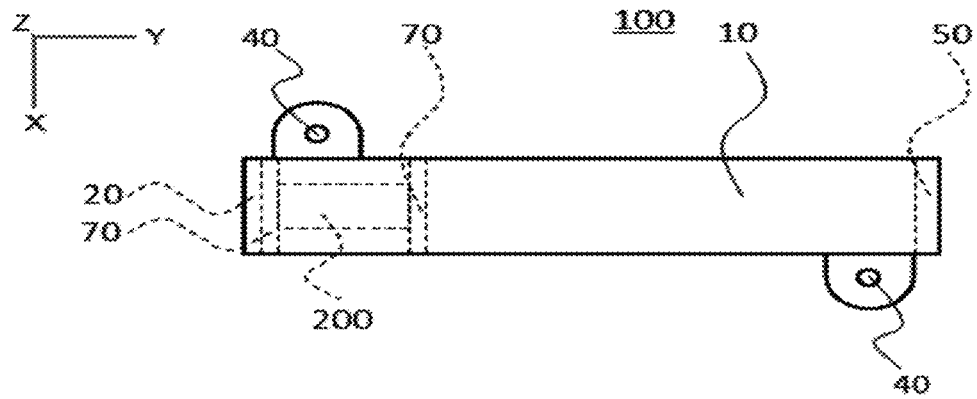
FIG. 4 is a schematic top view of the boost antenna.

The EM tag described in Patent Literature 2 is a UHF tag provided with a dipole antenna as described, for example, in FIG. 4 and the cavity described in Patent Literature 2 is intended to decouple the UHF tag provided with the dipole antenna from the metal surface, sensitivity of the dipole antenna would normally drastically deteriorate when disposed on the metal surface, but the sensitivity of the UHF tag in Patent Literature 2 is unlikely to deteriorate. However, the dipole antenna described in FIG. 4 is large, having a length of 95 mm, and moreover, the disclosure described in Patent Literature 2 is difficult to apply to a planar inverted-F antenna or the like that is becoming smaller.

The RFID tag described in Patent Literature 3 is an RFID tag with an RFID module disposed on a grounding casing of a housing constructed of the grounding casing and the coupling casing. The housing of the RFID tag described in Patent Literature 3 is provided with a shape of a planar inverted-F antenna and the length of the coupling casing is ¼λ, and so a resonance frequency of the housing provided with the shape of the planar inverted-F antenna corresponds to a resonance frequency of the RFID tag, and the RFID module itself has no resonance characteristic. However, an RFID module provided with an antenna normally has resonance characteristics, and the disclosure described in Patent Literature 3 is not applicable to the RFID module provided with the antenna.

The RFID tag described in Patent Literature 4 implements a small RFID tag with a built-in inverted F antenna by using a ceramic multilayer substrate, disposing the RFID chip inside the multilayer substrate and providing a capacity conductor that applies a capacitance to the antenna conductor, but the communication distance as the RFID may be insufficient depending on the application.

The present disclosure provides an RFID tag with a boost antenna, a conductor provided with the RFID tag with a boost antenna, and an RFID system including the RFID tag with a boost antenna, that can improve a communication distance by combining a boost antenna with a small RFID tag.

Further, the present disclosure provides an RFID tag with a boost antenna that can adjust two resonance frequencies provided in the RFID tag with a boost antenna to enable transmission/reception in a wideband or in two frequency bands by adjusting a resonance frequency of the RFID tag and the boost antenna, and a coupling coefficient between the RFID tag and the boost antenna.

Hereinafter, embodiments of the present disclosure will be described with reference to the accompanying drawings. In the following description, identical components are assigned identical reference numerals. When reference numerals are identical, names and functions thereof are also identical. Therefore, detailed description thereof will not be repeated.

First Embodiment

Figure 1:
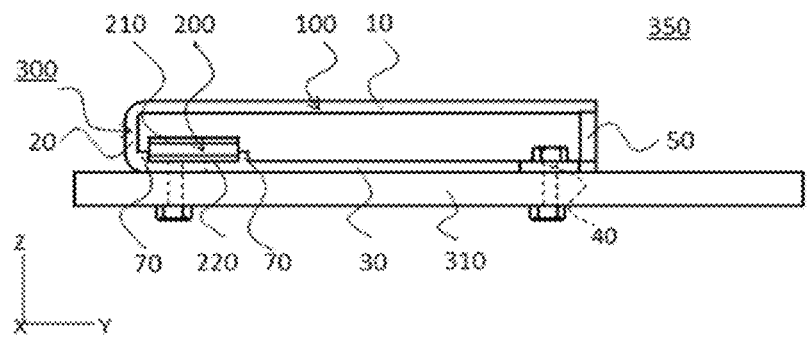
FIG. 1 is a schematic side view of an RFID tag with a boost antenna fixed to a conductor.
Figure 2:
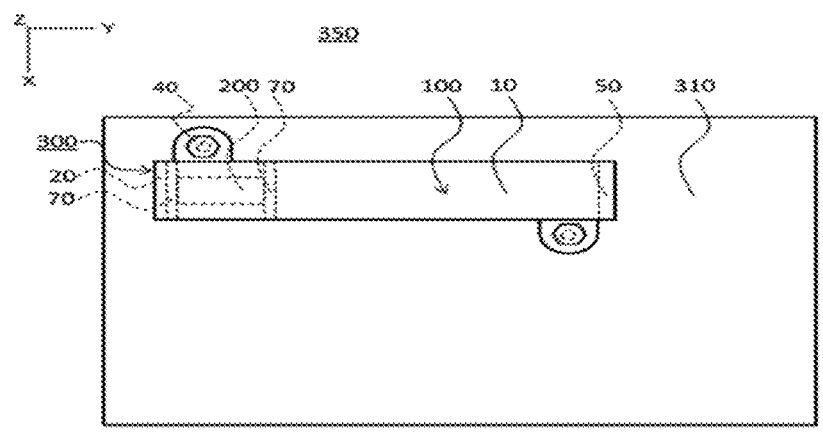
FIG. 2 is a schematic top view of the RFID tag with a boost antenna fixed to the conductor.

FIG. 1 is a schematic side view of an RFID tag 300 with a boost antenna according to a first embodiment fixed to a conductor 310, and FIG. 2 is a schematic top view of the RFID tag 300 with a boost antenna according to the first embodiment fixed to the conductor 310.

The RFID tag 300 with a boost antenna includes a boost antenna 100 and an RFID tag 200. The RFID tag 200 is disposed at a position between a radiation unit 10 and a ground unit 30 of the boost antenna 100 and closer to a short circuit unit 20 than to a center position in a longitudinal direction of the radiation unit 10.

In the following description, as described in FIG. 1 and FIG. 2, a direction of a line connecting one end side (short circuit unit 20 side) of the boost antenna 100 and the other end side (opening end side) is assumed to be a Y direction. A direction of a line connecting the ground unit 30 and the radiation unit 10 (zenithal direction) is assumed to be a Z direction and a direction orthogonal to the Y direction and the Z direction is assumed to be an X direction.

In FIG. 1 and FIG. 2, the RFID tag 300 with a boost antenna is fixed to the conductor 310. This is because when the RFID tag 300 is fixed to the conductor 310, the communication distance of the RFID tag 300 with a boost antenna further improves. Even when the RFID tag 300 with a boost antenna is fixed to other than the conductor 310, for example, plastic, the communication distance thereof can improve compared to the RFID tag 200 as a single unit.

In FIG. 1 and FIG. 2, although the RFID tag 300 with a boost antenna is directly electrically connected to the conductor 310, the RFID tag 300 with a boost antenna may be fixed to the conductor 310 using an adhesive and connected to the conductor 310 via a capacitance composed of an adhesive layer.

(Structure of Boost Antenna 100)

Figure 3:
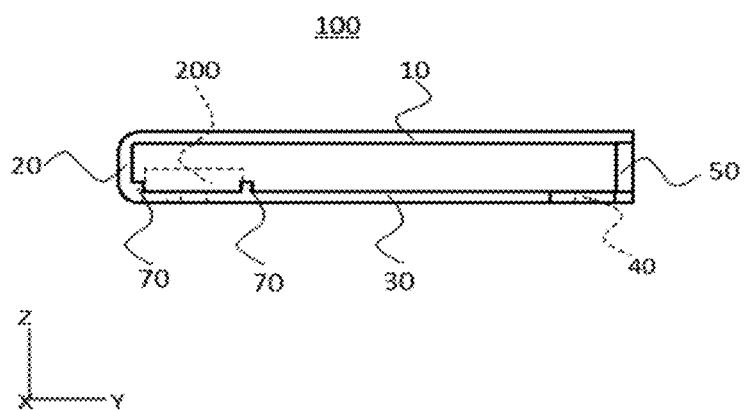
FIG. 3 is a schematic side view of the boost antenna.

FIG. 3 is a schematic side view of the boost antenna 100 and FIG. 4 is a schematic top view of the boost antenna 100.

The boost antenna 100 is formed of the conductive radiation unit 10, the conductive ground unit 30 facing the radiation unit 10, and the short circuit unit 20 that connects one end of the radiation unit 10 and one end of the ground unit 30 and causes the radiation unit 10 and the ground unit 30 to electrically conduct to each other.

As the conductive materials of the radiation unit 10, the short circuit unit 20 and the ground unit 30 of the boost antenna 100, aluminum, iron or copper may be used. In this case, it is possible to form the boost antenna 100 with low resistance and high shape accuracy.

The boost antenna 100 can be formed by folding one conductor. When the material is aluminum, the boost antenna 100 can also be formed using extrusion molding.

The thicknesses of the conductive materials of the radiation unit 10, the short circuit unit 20 and the ground unit 30 of the boost antenna 100 may be 0.5 mm or more and 3 mm or less.

In FIG. 3 and FIG. 4, although the short circuit unit 20 of the boost antenna 100 is formed into a rectangular parallelepiped shape having the same width as the width of the radiation unit 10, the short circuit unit 20 can also be formed, for example, of one or a plurality of circular or quadrangular column shaped posts.

Figure 5:
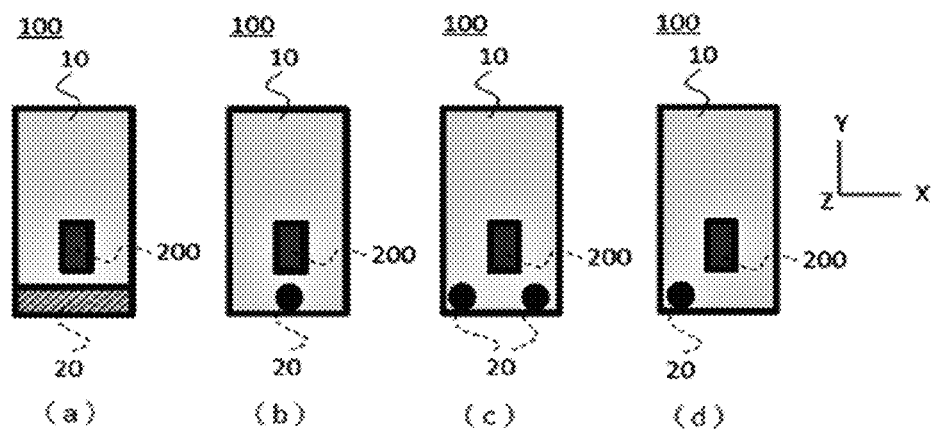
FIG. 5 is a schematic top view illustrating a shape of a short circuit unit of the boost antenna.

FIG. 5 is a schematic top view of the boost antenna 100 showing several examples of the short circuit unit 20.

FIG. 5(a) is the same rectangular parallelepiped short circuit unit 20 as that in FIG. 3 and FIG. 4. FIG. 5(b) is the short circuit unit 20 with the one circular column shaped post disposed at the center of the radiation unit 10 in the X direction. FIG. 5(c) is the short circuit unit 20 with two circular column shaped posts disposed in the vicinity of both ends in the X direction of the radiation unit 10. FIG. 5(d) is the short circuit unit 20 with one circular column shaped post disposed in the vicinity of an end in the X direction of the radiation unit 10.

By changing the shape and the position of the short circuit unit 20, it is possible to change the resonance frequency of the boost antenna 100 and the coupling coefficient between the boost antenna 100 and the RFID tag 200 disposed on the boost antenna 100 even when the shape (width W, length L, height T) of the radiation unit 10 is unchanged.

An insulating support member 50 may be inserted between the radiation unit 10 and the ground unit 30 of the boost antenna 100. In this case, there is less variation in the distance between the opposing radiation unit 10 and ground unit 30. By using a material with a high relative permittivity as the insulating support member 50, it is possible to shorten the wavelength of the radio wave and reduce the shape of the radiation unit 10 and the ground unit 30 in the insulating support member 50, and increase the substantial opening area of the boost antenna 100.

When the insulating support member 50 is inserted, by adjusting the position of the insulating support member 50 in the Y direction of the radiation unit 10 of the boost antenna 100, it is possible to adjust the resonance frequency of the boost antenna 100 without changing the shapes of the radiation unit 10 and the ground unit 30.

The ground unit 30 can be provided with a protrusion 70 for positioning the RFID tag 200 on the ground unit 30. The protrusion 70 may be a linear protrusion 70 orthogonal to a line connecting one end and the other end (an end portion on an opposite side of the one end) of the ground unit 30. This is because the RFID tag 200 is easily inserted when the RFID tag 200 is inserted in the boost antenna 100 and the RFID tag 200 has a large variation in characteristics due to a positional shift in the Y direction on the ground unit 30.

Figure 6:
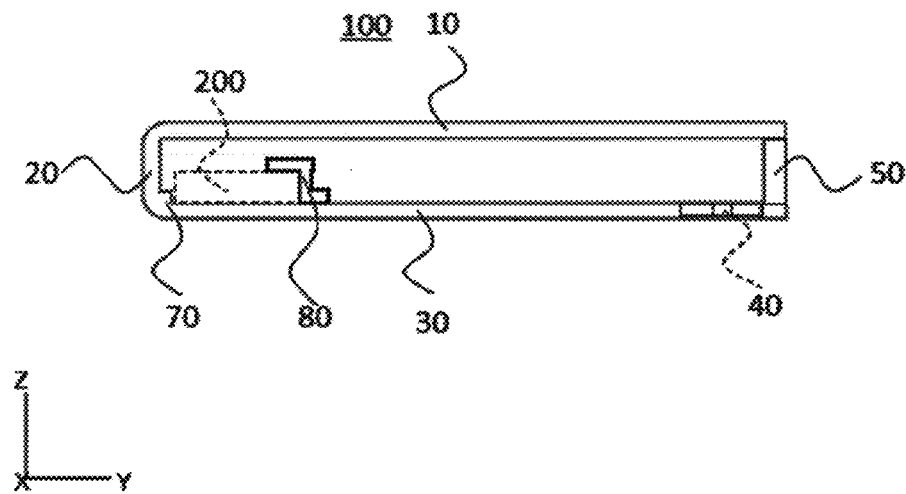
FIG. 6 is a schematic side view of the boost antenna provided with a metal fitting.

FIG. 6 shows a schematic side view of the boost antenna 100 provided with a metal fitting 80 to fix the RFID tag 200 to the ground unit 30. After the RFID tag 200 is disposed on the ground unit 30, the metal fitting 80 can be fixed to the ground unit 30 using a screw (not shown) or the like. In this case, the RFID tag 200 can be fixed to the ground unit 30 of the boost antenna 100 without having to use any adhesive. Avoiding use of any adhesive that are a concern for heat resistance makes it possible to improve heat resistance of the RFID tag 300 with a boost antenna.

In the boost antenna 100, the ground unit 30 can be provided with a mounting hole 40. In this case, by screwing the boost antenna 100 to the conductor 310, it is possible to reduce variations in relative position between the boost antenna 100 and the conductor 310.

(Resonance Frequency of Boost Antenna 100)

Figure 7:
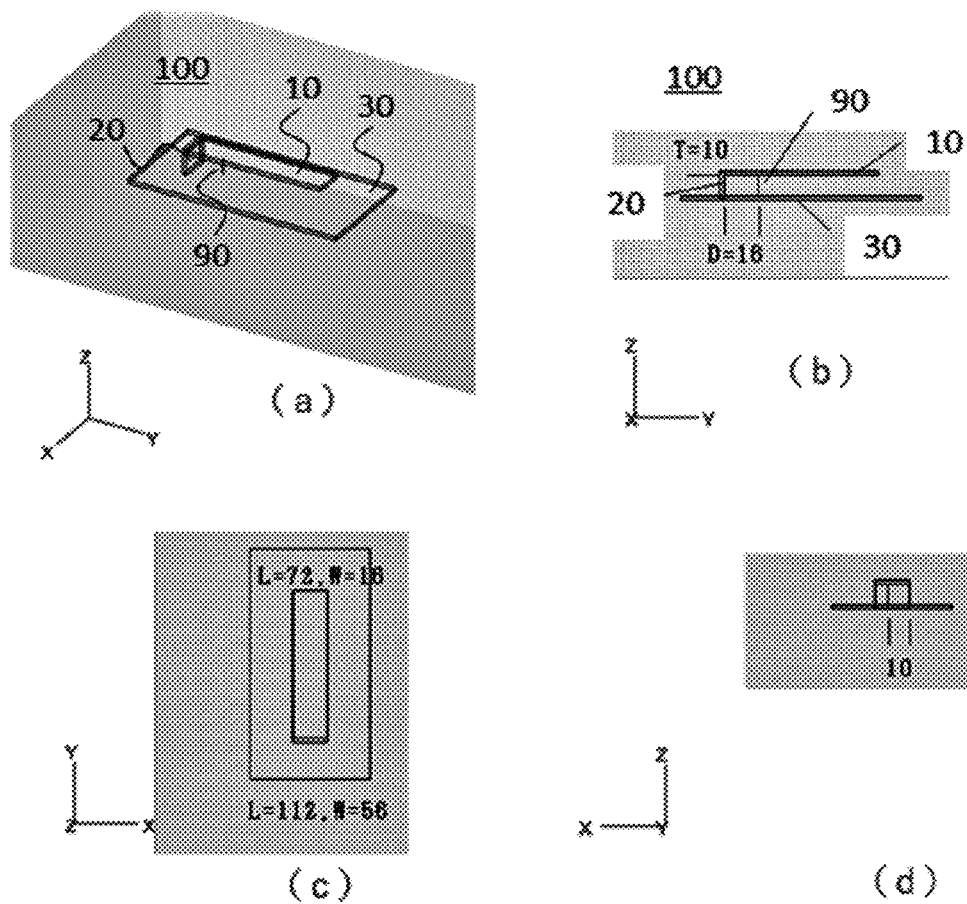
FIG. 7 is a diagram illustrating the shape of the boost antenna used for a simulation of a resonance frequency.

Dependency of the resonance frequency of the boost antenna 100 on the shape (length L, width W) of the radiation unit 10 was calculated according to an FDTD method using a simple model. The shape of the model used for the calculation is shown in FIG. 7. In FIG. 7, FIG. 7(a) shows a perspective view, (b) shows a plan view viewed from the X direction, (c) shows a plan view viewed from the Z direction and (d) shows a plan view viewed from the Y direction. Numbers in the drawings represent the respective dimensions and the unit is mm. Note that the above Y direction corresponds to the direction of a line connecting the one end and the other end (end portion on the opposite side of the one end) of the radiation unit 10.

In the model used for the calculation, assuming a case where the boost antenna 100 is fixed to a metal surface, the area of the ground unit 30 is set to 112 mm×56 mm, larger than the area of the radiation unit 10. Although a power supply unit 90 is not included in the boost antenna 100 itself, in the above calculation, the power supply unit 90 is disposed at a position in the vicinity of the center in the X direction of the radiation unit 10, 16 mm from the short circuit unit 20.

Figure 8:
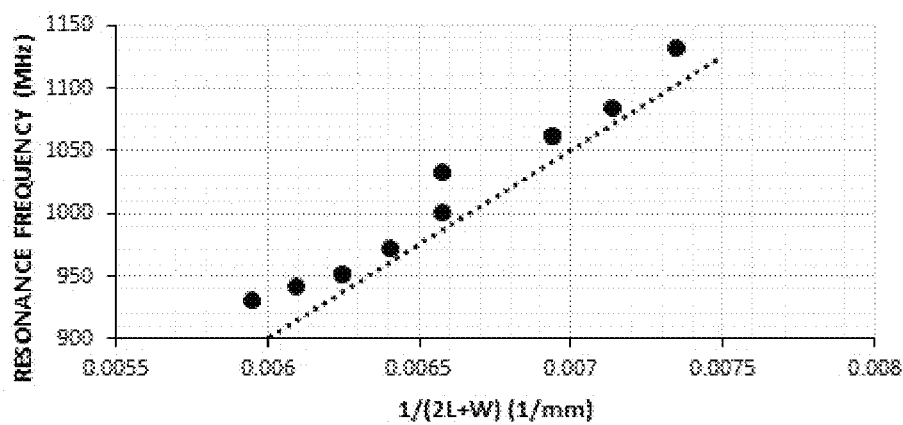
FIG. 8 is a diagram illustrating simulation results of the resonance frequency of the boost antenna.

FIG. 8 shows simulation results of a relationship between a value of 2L+W of the radiation unit 10 and the resonance frequency when the length L and the width W of the radiation unit 10 are changed. In FIG. 8, the resonance frequency of the boost antenna 100 is substantially proportional to 1/(2L+W) and is plotted at a position close to a straight line representing a relationship between 1/(2L+W) and the resonance frequency when a half wavelength of the resonance frequency is equal to 2L+W.

In the case of a standard planar inverted-L antenna, $2(L+W)=(1/2)\lambda$ at resonance, whereas in the case of the boost antenna 100, $2L+W=(1/2)\lambda$, and this is presumed to be attributable to the fact that the short circuit unit 20 in the boost antenna 100 in FIG. 7 extends over a whole W of the radiation unit 10 and the effective peripheral length of the radiation unit 10 is 2L+W. Note that though not described in FIG. 8, when the short circuit unit 20 is not formed in the rectangular parallelepiped shape having the same width as the short side of the radiation unit 10 but formed of a post in a columnar shape or the like, the resonance frequency of the boost antenna 100 changes. As shown, for example, in FIG. 5(b), when one column shaped post is disposed at a center position on one end side of the radiation unit 10, the resonance frequency of the boost antenna 100 is lower compared to the case where the short circuit unit 20 having a rectangular parallelepiped shape of the same width as the width of the radiation unit 10 as shown in FIG. 5(a).

(Structure and Directivity of RFID Tag 200)

Figure 9:
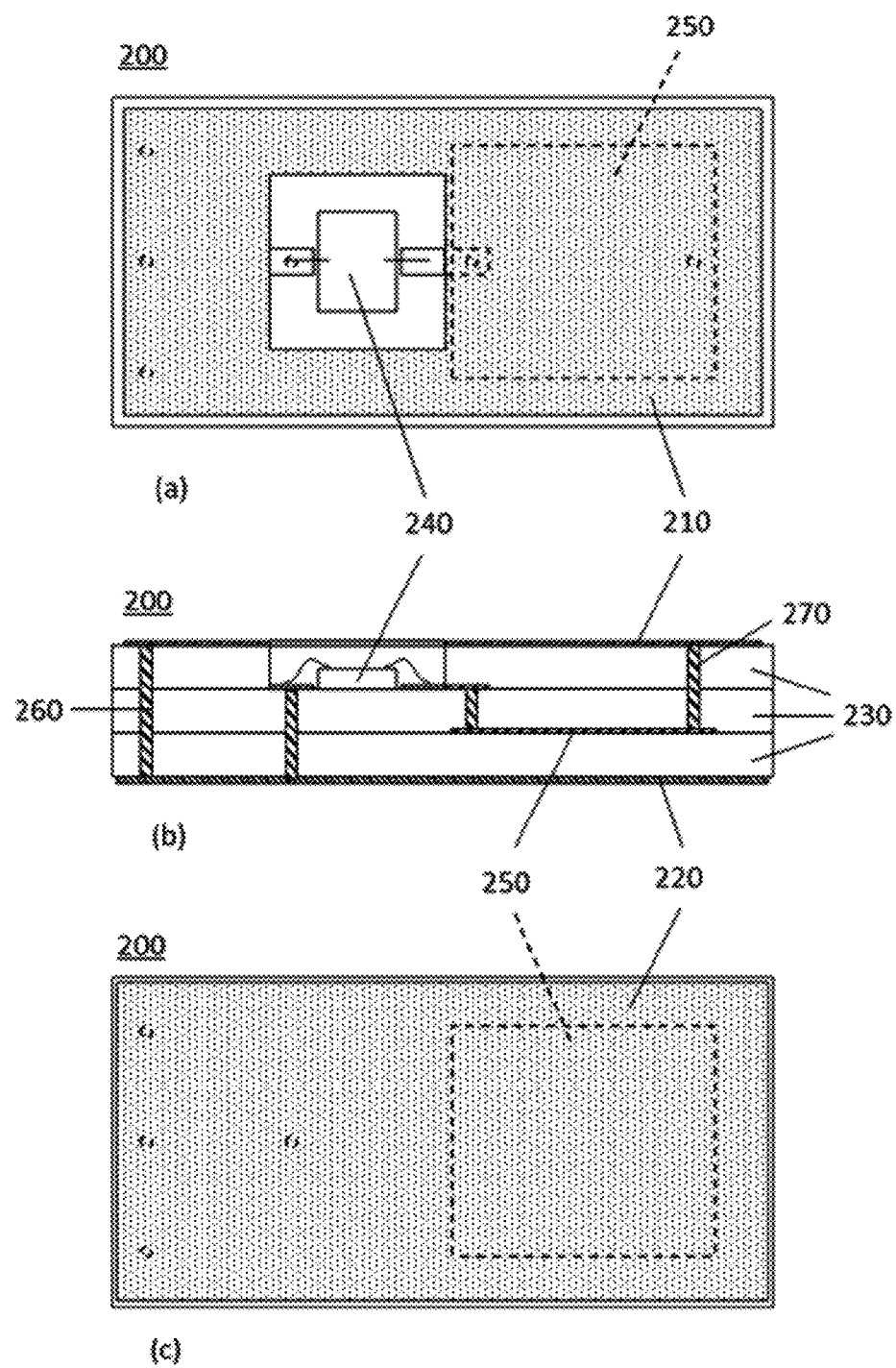
FIG. 9 is a diagram illustrating a structure of the RFID tag.

FIG. 9 shows an example of the RFID tag 200. FIG. 9(a) shows a schematic top view, FIG. 9(b) shows a schematic cross-sectional view and FIG. 9(c) shows a schematic bottom view.

The RFID tag 200 is provided with an insulating substrate 230, a radiation plate 210, a ground plate 220, a short circuit conductor 260, a capacity part conductor 250, a capacity part penetrating conductor 270 and an IC chip 240.

The radiation plate 210 is provided on a top surface of the insulating substrate 230, the ground plate 220 is provided on an undersurface of the insulating substrate 230, and the radiation plate 210 and the ground plate 220 are electrically connected via the short circuit conductor 260.

The capacity part conductor 250 is disposed inside the insulating substrate 230 so as to face part of the ground plate 220 and connected to the radiation plate 210 via the capacity part penetrating conductor 270.

The IC chip 240 is stored in a concave portion provided on the top surface of the insulating substrate 230, electrically connected to the radiation plate 210 and the ground plate 220 and functions as a power supply unit.

An antenna of the RFID tag 200 is an inverted F type antenna.

Note that the reason that the RFID tag 200 described in FIG. 9 is provided with the capacity part conductor 250 and the capacity part penetrating conductor 270 is to make smaller the shape of the RFID tag 200 by increasing the capacitance between the radiation plate 210 and the ground plate 220. However, when the same resonance frequency is required, the shape of the RFID tag 200 becomes a little larger, but the capacity part conductor 250 and the capacity part penetrating conductor 270 may be omissible.

Figure 10:
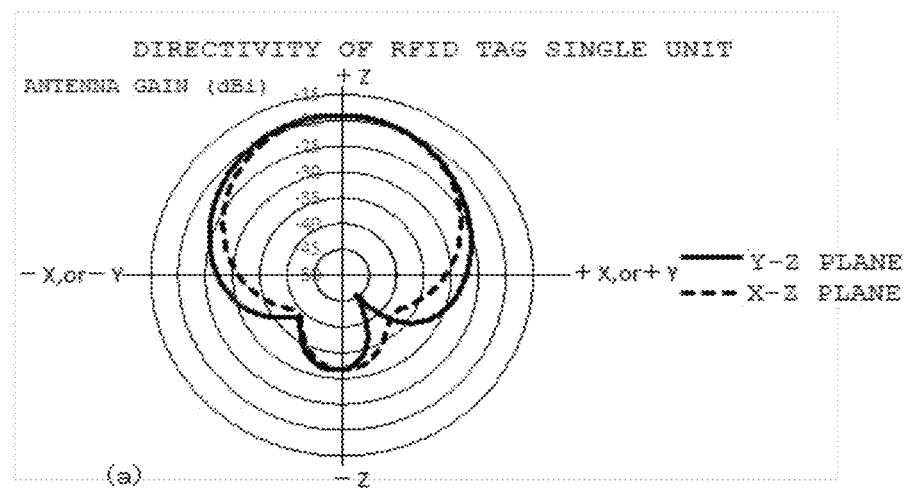
FIG. 10 is a diagram illustrating directivity of the RFID tag.
Figure 10:
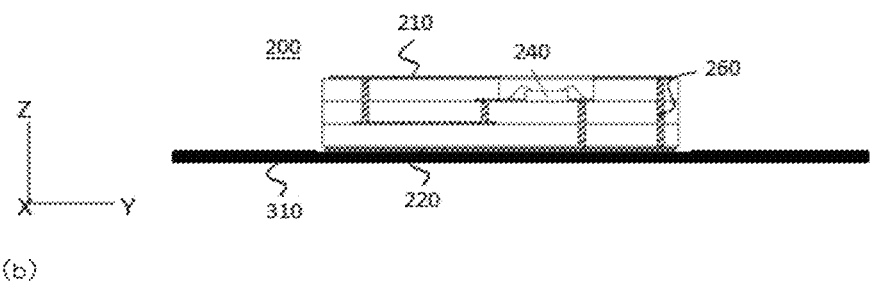

FIG. 10 illustrates an example of simulation results of directivity of the RFID tag 200. FIG. 10(b) illustrates a placement direction of the RFID tag 200 in X-Y-Z coordinates and FIG. 10(a) illustrates directivity of antenna gain of the RFID tag 200 on an X-Z plane and a Y-Z plane.

In FIG. 10, the Z direction corresponds to a zenithal direction of the RFID tag 200, that is, an upward direction in FIG. 10(b) and the Y direction corresponds to a rightward direction in FIG. 10(b). In the simulation, the RFID tag 200 is disposed on the conductor 310.

The RFID tag 200 in FIG. 10(b) has strong directivity in the zenithal direction, and when the RFID tag 200 is disposed on the ground unit 30 of the boost antenna 100, a radio wave is radiated from the RFID tag 200 toward the radiation unit 10.

The RFID tag 200 shows higher antenna gain in the Y direction than in the X direction and more radio waves are radiated in the Y direction than in the X direction.

The RFID tag 200 described in FIG. 9 is the planar inverted-F antenna type RFID tag 200, but as the RFID tag 200 to be used for the present disclosure, the RFID tag 200 provided with an antenna having directivity in the zenithal direction such as an inverted-F antenna or a patch antenna when disposed on a metal can be used.

(Structure of RFID Tag 300 with Boost Antenna)

The RFID tag 300 with a boost antenna is described in FIG. 1 and FIG. 2.

In FIG. 1 and FIG. 2, the RFID tag 200 is disposed between the radiation unit 10 and the ground unit 30 of the boost antenna 100 and at a position closer to the short circuit unit 20 than to the center in the Y direction of the radiation unit 10. When the RFID tag 200 is disposed on the ground unit 30 of the boost antenna 100, the RFID tag 200 is sandwiched between the protrusions 70 and bonded thereto, and it is thereby possible to prevent positional shifts in the Y direction of the boost antenna 100.

The boost antenna 100 can be screwed to the conductor 310 using the mounting hole 40. In this case, it is possible to reduce variations in relative positions of the boost antenna 100 and the conductor 310.

Furthermore, by causing the boost antenna 100 to electrically conduct to the conductor 310, the conductor 310 is allowed to function as an extension of the ground unit 30 of the boost antenna 100. In this case, the boost antenna 100 is substantially equivalent to the boost antenna 100 with the ground unit 30 having a large area, which improves the antenna gain.

(Communication Distance of RFID Tag 300 with Boost Antenna)

Figure 11:
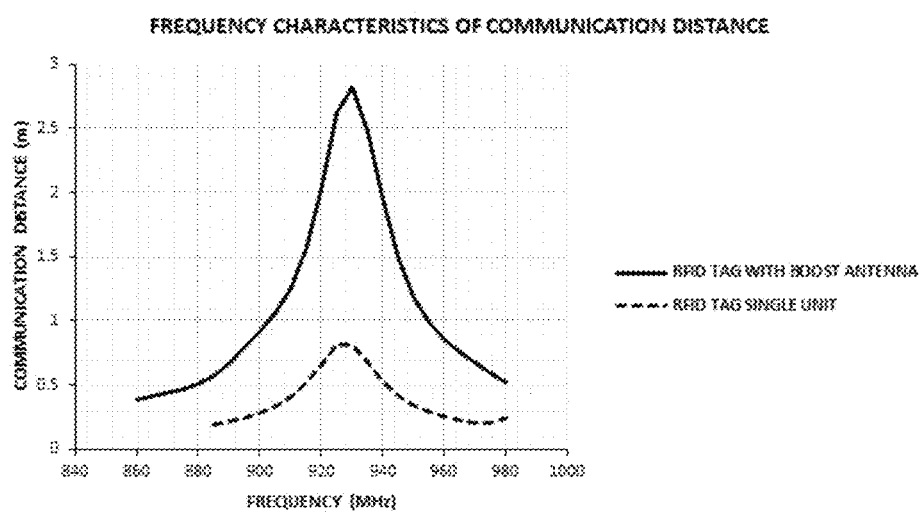
FIG. 11 is a diagram illustrating measurement results of frequency characteristics of a communication distance of the RFID tag with a boost antenna.

FIG. 11 illustrates measurement results of communication distances of the RFID tag 200 as a single unit and the RFID tag 300 with a boost antenna measured using Tagformance manufactured by voyantic.

Placing the RFID tag 200 on the boost antenna 100 so as to function as the RFID tag 300 with a boost antenna significantly improves communication distance from 0.8 m to 2.8 m compared to the RFID tag 200 as a single unit.

(Resonance Frequency of RFID Tag 300 with Boost Antenna)

With the RFID tag 200 as a single unit, the boost antenna 100 as a single unit and the RFID tag 300 with a boost antenna disposed on a 200 mm square conductor 310 (copper plate), their respective resonance frequencies were determined by simulation. The shape of the RFID tag 200 was fixed to 6 mm×3 mm×1.7 mm and the shape and structure of the boost antenna 100 were changed. A space of 300 μm corresponding to the thickness of the adhesive was provided between the bottom surface of the RFID tag 200 and the ground unit 30 of the boost antenna 100, between the boost antenna 100 and the conductor 310 and between the ground plate 220 and the conductor 310 of the RFID tag 200.

Figure 12:
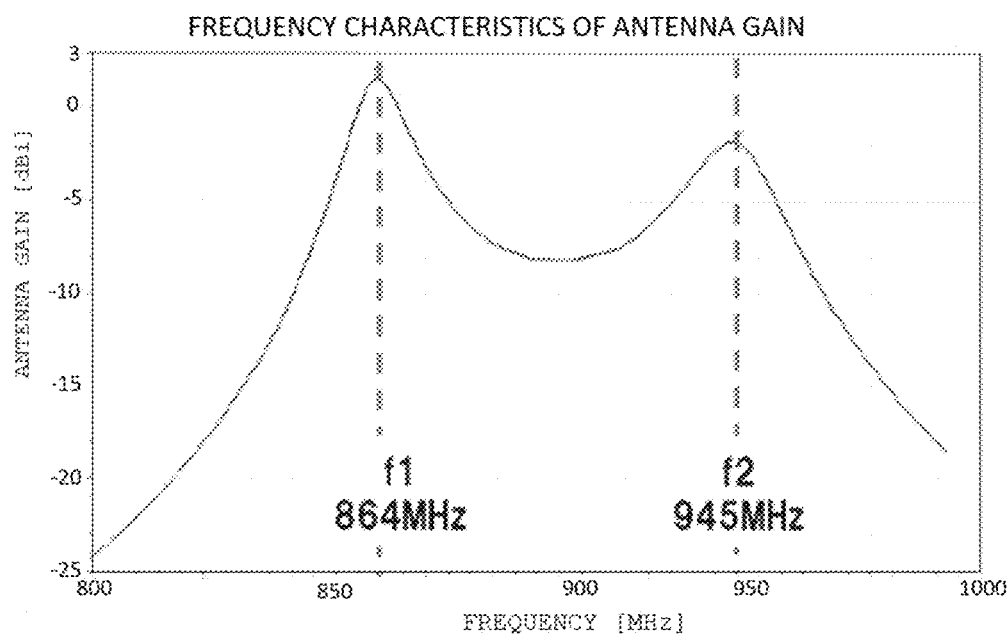
FIG. 12 is a diagram illustrating simulation results of frequency characteristics of antenna gain of a dual-band compatible RFID tag with a boost antenna.

FIG. 12 illustrates an example of simulation results of the dual-band compatible RFID tag 300 with a boost antenna. FIG. 12 illustrates simulation results of antenna gain when the RFID tag 200 having a resonance frequency of 927 MHz was disposed on the ground unit 30 in the vicinity of the short circuit unit 20 of the boost antenna 100 having a resonance frequency of 881 MHz. Note that in the boost antenna 100 used for the simulation, as shown in FIG. 5(b), one column shaped post was disposed at the center position on a short-side side of the radiation unit 10 and the insulating support member 50 was inserted between the radiation unit 10 and the other end (opening side) of the ground unit 30.

According to FIG. 12, the RFID tag 300 with a boost antenna has resonance frequencies of 864 MHz and 945 MHz, those frequencies are different from resonance frequency 927 MHz of the RFID tag 200 as a single unit or resonance frequency 881 MHz of the boost antenna 100 as a single unit, and moreover the RFID tag 300 with a boost antenna has a larger difference between the two resonance frequencies.

Generally, when two resonators are coupled, a resonance frequency f is known to satisfy following Equation 1, where resonance frequencies when the two resonators are not coupled are f01 and f02, and the coupling coefficient is k:

$$f^2 = \frac{f01^2 + f02^2 \pm \sqrt{(f01^2 - f02^2)^2 + 4f01^2 f02^2 k^2}}{2(1-k^2)} \quad \text{Equation 1}$$

("High Frequency Microwave Circuit_Fundamentals and Design" (by Yoshihiro Konishi, Kay Lab Publishing, published November 2003) see page 156).

According to Equation 1, the two resonance frequencies f1 and f2 at the time of coupling change depending on the resonance frequencies f01 and f02 when the two resonators are uncoupled, and the coupling coefficient k.

In the case of the RFID tag 300 with a boost antenna, since the RFID tag 200 single unit and the boost antenna 100 each have resonance characteristics, Equation 1 is basically considered applicable. In the case of FIG. 12, if it is assumed that f01=881 MHz, f02=927 MHz, f1=864 MHz and f2=945 MHz in Equation 1, the coupling coefficient k is approximately 0.07.

Therefore, by adjusting f01, f02, and k on the basis of Equation 1, it is possible to design the dual-band compatible RFID tag 300 with a boost antenna with the resonance frequency of the RFID tag 300 with a boost antenna set, for example, to two frequencies: 860 MHz for the EU region and 920 MHz for Japan.

Figure 13:
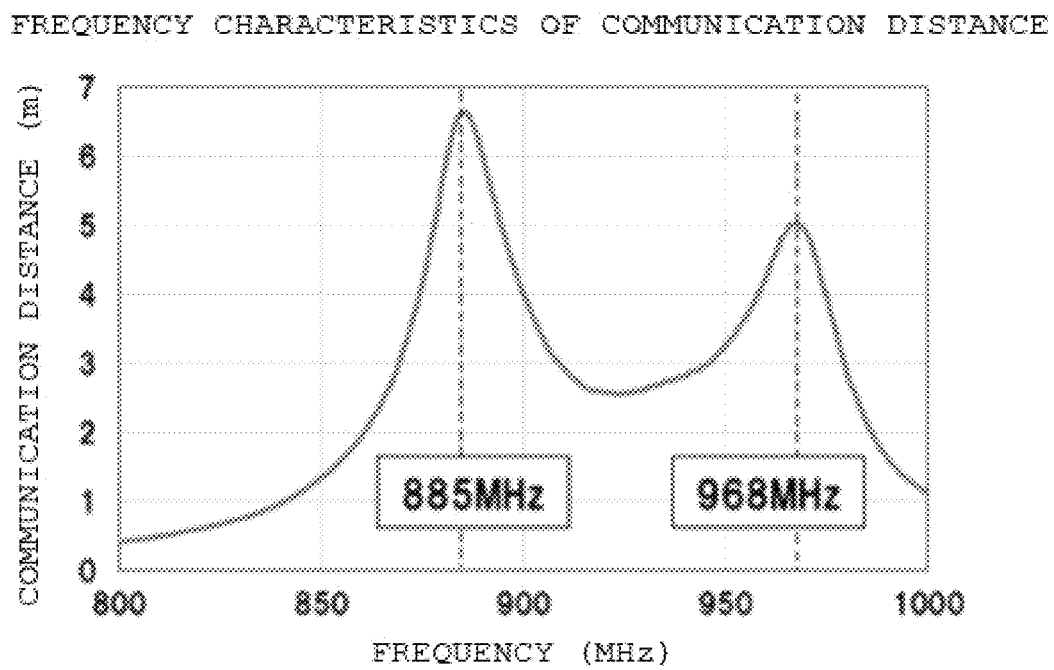
FIG. 13 is a diagram illustrating measurement results of frequency characteristics of a communication distance of the dual-band compatible RFID tag with a boost antenna.

FIG. 13 illustrates measurement results of the communication distance of the dual-band compatible RFID tag 300 with a boost antenna. In the RFID tag 300 with a boost antenna shown in FIG. 13, the short circuit unit 20 is constructed of one post, the insulating support member 50 is inserted between the radiation unit 10 and the ground unit 30 on the opening end side in the Y direction, and the RFID tag 200 is disposed on the ground unit 30 in the vicinity of the short circuit unit 20 of the boost antenna 100 as shown in FIG. 5(*b*). The shape of the boost antenna 100 is W=15 mm, L=60 mm, T (height)=10 mm.

Measurement was performed using Tagformance manufactured by voyantic. According to FIG. 13, the RFID tag 300 with a boost antenna can communicate with an RFID reader of about 885 MHz located approximately 6 m apart and an RFID reader of about 968 MHz located approximately 4 m apart, and it is possible to implement the dual-band compatible RFID tag 200 that can communicate at two necessary frequencies by adjusting the resonance frequencies of the boost antenna 100 and the RFID tag 200 and adjusting the coupling coefficient of the boost antenna 100 and the RFID tag 200.

By bringing the resonance frequencies of the boost antenna 100 and the RFID tag 200 closer to each other and lowering the coupling coefficient between the boost antenna 100 and the RFID tag 200, it is also possible to implement the RFID tag 300 with a boost antenna that brings the two resonance frequencies of the RFID tag 300 with a boost antenna closer to each other and widens the transmission/reception frequency band.

(Position of RFID Tag 200)

The resonance frequency and the gain of the RFID tag 300 with a boost antenna change depending on which position in the Y direction of the ground unit 30 of the boost antenna 100, the RFID tag 200 is disposed.

Figure 14A:
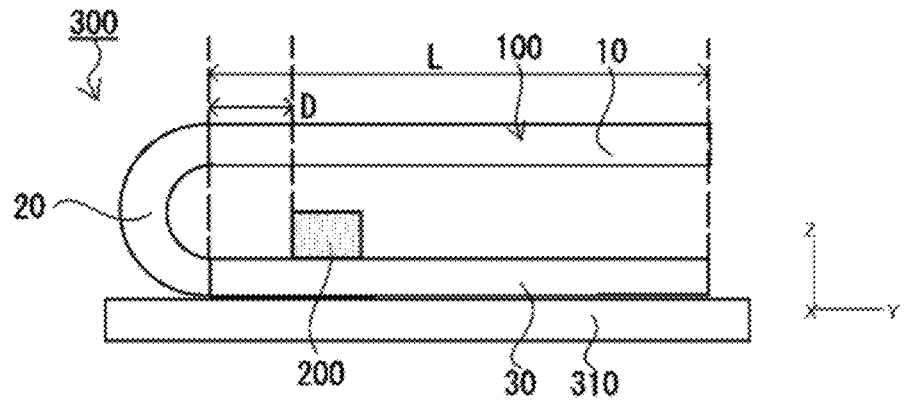
FIG. 14(a) is a schematic view illustrating a position of the RFID tag of the RFID tag with a boost antenna and FIG. 14(b) is a diagram illustrating simulation results of a correlation between a distance D between the RFID tag and the short circuit unit, and the resonance frequency of the RFID tag with a boost antenna.
Figure 14B:
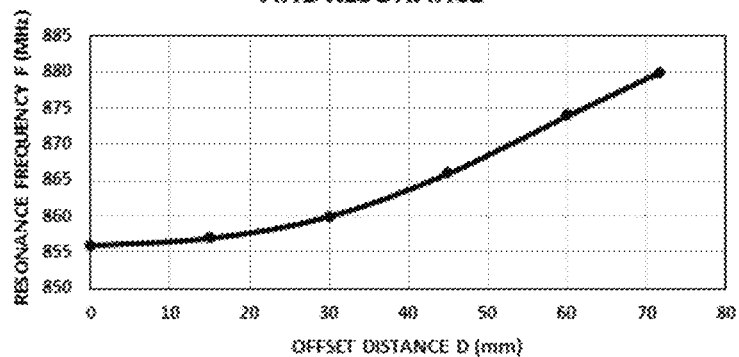

FIG. 14(*a*) is a schematic view illustrating the position of the RFID tag 200 of the RFID tag 300 with a boost antenna and FIG. 14(*b*) is a diagram illustrating simulation results of correlation between an offset distance D between the RFID tag 200 and the short circuit unit 20, and a resonance frequency F of the RFID tag 300 with a boost antenna. Under simulation conditions in which the boost antenna 100 has a length L=80 mm, a width of 15 mm, a thickness of 5 mm, the RFID tag 200 has a shape of 6 mm×3 mm×1.7 mm, and the RFID tag 200 has a resonance frequency of 860 MHz, the resonance frequency F was determined by simulation by changing the offset distance D between the RFID tag 200 and the short circuit unit 20 from 0 mm to 15 mm, 30 mm, 45 mm, 60 mm, 71.5 mm. Note that the RFID tag 300 with a boost antenna is fixed onto the conductor 310.

As is seen from FIG. 14(*b*), the resonance frequency F of the RFID tag 300 with a boost antenna is 856 MHz when the offset distance D=0 mm, 864 MHz near the center when D=40 mm, and increases up to 880 MHz on the opening end side when D=71.5 mm. However, when the RFID tag 200 is disposed on the opening end side, antenna gain drops (see FIG. 15), but since the drop of antenna gain is small up to the vicinity of the center, it is possible to adjust the resonance frequency F of the RFID tag 300 with a boost antenna by adjusting the position of the RFID tag 200 within a range of at least D=0 to 40 mm.

Figure 15:
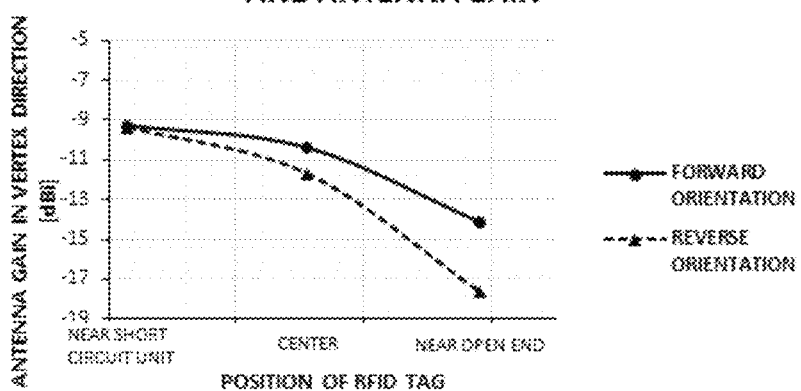
FIG. 15 is a diagram illustrating simulation results of a relationship between a position of the RFID tag and antenna gain of the RFID tag with a boost antenna.

FIG. 15 illustrates simulation results of a relationship between the position of the RFID tag 200 of the RFID tag 300 with a boost antenna and antenna gain. As is seen from FIG. 15, the gain of the RFID tag 300 with a boost antenna in the Z direction (zenithal direction) is the largest when the RFID tag 200 is disposed near the short circuit unit 20 of the boost antenna 100, gradually declines up to the center in the Y direction and abruptly deteriorates from the center to near the opening end. Therefore, the RFID tag 200 may be disposed closer to the short circuit unit side than to the center in the Y direction of the ground unit 30 of the boost antenna 100.

Note that the positional dependency of antenna gain is presumed to be attributable to the fact that the boost antenna 100 is provided with the inverted-L structure and energy can be transmitted more efficiently from the RFID tag 200 to the boost antenna 100 by bringing the RFID tag 200 closer to the short circuit unit 20, which is a node of a standing wave at resonance of the boost antenna 100.

(Direction of RFID Tag 200)

FIG. 15 also describes the antenna gain when the RFID tag 200 is disposed so as to have forward orientation, that is, when the short circuit conductor 260 is disposed on the opening end side in the Y direction of the ground unit 30, and reverse orientation, that is, when the short circuit conductor 260 is disposed on the short circuit unit 20 side in the Y direction of the ground unit 30. When the RFID tag 200 is disposed in the vicinity of the short circuit unit 20, the difference between the forward orientation and the reverse orientation is small, whereas when the RFID tag 200 is disposed closer to the opening end side than to the center of the ground unit 30, the drop of antenna gain is larger when the short circuit conductor 260 is disposed so as to have reverse orientation, and so, in the RFID tag 200, the short circuit conductor 260 may be disposed on the opening end side of the ground unit 30.

Note that the directional dependency of antenna gain is presumed as follows. The antenna of the RFID tag 200 is an inverted-F type antenna in which an opening is located on an opposite side of the short circuit conductor 260 and more lines of electric force are radiated from the opening. Therefore, by directing the opening toward the short circuit unit 20, energy can be transmitted more efficiently from the RFID tag 200 to the boost antenna 100.

When the RFID tag 200 is disposed toward a direction turned by 90 degrees from the forward orientation or reverse orientation, the antenna gain drops significantly. More specifically, when the RFID tag 200 is turned by 90 degrees from the forward orientation and disposed, the antenna gain of the RFID tag 300 with a boost antenna is −29.5 dBi as opposed to −9.7 dBi, which is the antenna gain of the RFID tag 300 with a boost antenna when the RFID tag 200 is disposed toward the forward orientation. This is a value much lower than −19.0 dBi as the antenna gain of the RFID tag 200 as a single unit.

The reason why the antenna gain drops significantly when the RFID tag 200 is turned by 90 degrees from the forward orientation and disposed can be presumed as follows:

When the direction connecting the short circuit unit 20 of the boost antenna 100 and the opening end is aligned with the direction connecting the short circuit conductor 260 of the RFID tag 200 and the opening, the direction of the electric field and the magnetic field of the boost antenna 100 are aligned with the direction of the electric field and the magnetic field of the RFID tag 200, and a good coupling condition is achieved.

On the other hand, when the direction connecting the short circuit unit 20 of the boost antenna 100 and the opening end is made to be orthogonal to the direction connecting the short circuit conductor 260 of the RFID tag 200 and the opening, the direction of the electric field and the magnetic field of the boost antenna 100 and the direction of the electric field and the magnetic field of the RFID tag 200 are orthogonal to each other, and there is a concern about the coupling state.

(Insulating Support Member 50)

When the insulating support member 50 with high relative permittivity is inserted between the radiation unit 10 and the ground unit 30 of the boost antenna 100, it is possible to shorten the effective wavelength of a radio wave and make the shape of the boost antenna 100 smaller with respect to the same resonance frequency. Moreover, depending on the position where the insulating support member 50 is inserted, the degree to which the effective radio wave wavelength is shortened and the degree to which the shape of the boost antenna 100 is reduced with respect to the same resonance frequency change.

Figure 16:
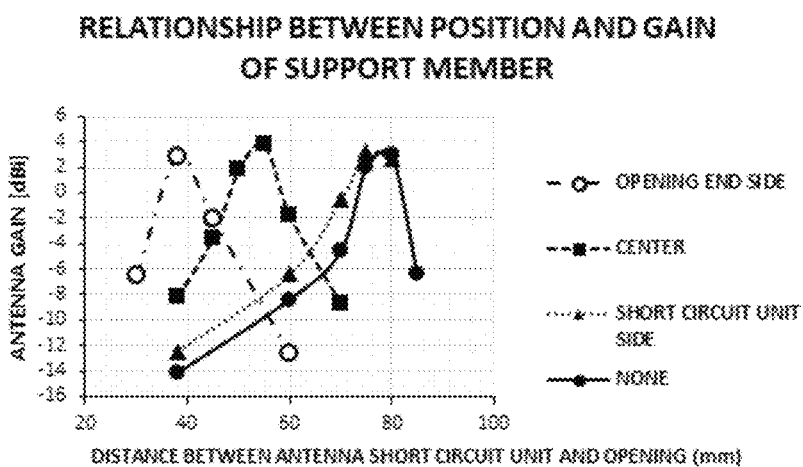
FIG. 16 is a diagram illustrating simulation results of the relationship between the position of the support member and the antenna gain in case an insulating support member is inserted into the RFID tag with a boost antenna.

FIG. 16 illustrates simulation results of a relationship between an antenna size and an antenna gain, using insertion or no insertion of the insulating support member 50 into the RFID tag 300 with a boost antenna, and the insertion position as a parameter. The RFID tag 300 with a boost antenna in FIG. 16 corresponds to the RFID tag 300 with a boost antenna having the structure shown in FIG. 1 and FIG. 2 in which the width in the X direction of the boost antenna 100 is fixed to 10 mm and the length in the Y direction is changed. Furthermore, the simulation was performed by fixing the length of the insulating support member 50 to 10 mm and changing the position in the Y direction in three ways.

According to FIG. 16, the insertion of the insulating support member 50 makes it possible to reduce the length in the Y direction of the boost antenna 100, which is optimal for a certain transmission/reception frequency. Furthermore, when inserting the same insulating support member 50, if the insulating support member 50 is inserted near the opening end side in the Y direction of the boost antenna 100, the length in the Y direction of the boost antenna 100 can be further shortened.

The result in FIG. 16 means that the resonance frequency is changed by changing the position of the insulating support member 50, and using this characteristic, it is possible to adjust the resonance frequency of the RFID tag 300 with a boost antenna by only adjusting the position of the insulating support member 50 without changing the shape of the boost antenna 100.

In the above description, although the boost antenna 100 is described as having an inverted L structure, if the RFID tag 200 is considered to correspond to a power supply circuit of the boost antenna 100, it can be said that the RFID tag 300 with a boost antenna constitutes an inverted-F antenna.

[Boost Antenna 100 of Other Embodiments]

Although the boost antenna 100 and the RFID tag 300 with a boost antenna described so far are based on the boost antenna 100 described in FIG. 3 and FIG. 4, the following other embodiments are also possible as the boost antenna 100 and the RFID tag 300 with a boost antenna.

(Boost Antenna 100 of Second Aspect)

Figure 17A:
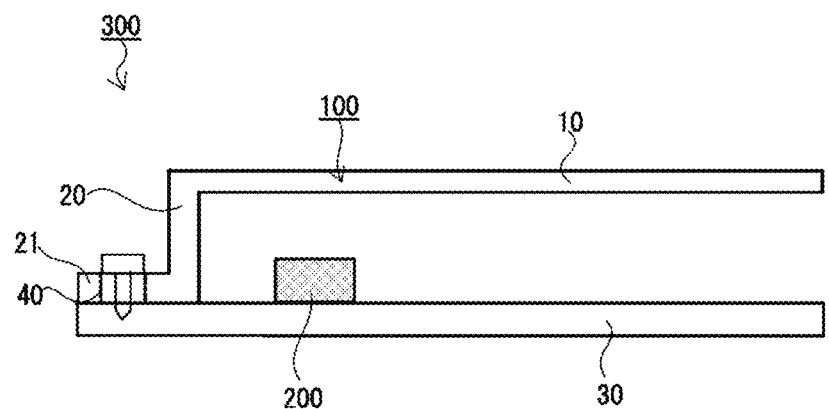
FIG. 17(a) is a schematic side view of a boost antenna according to a second aspect.
Figure 17B:
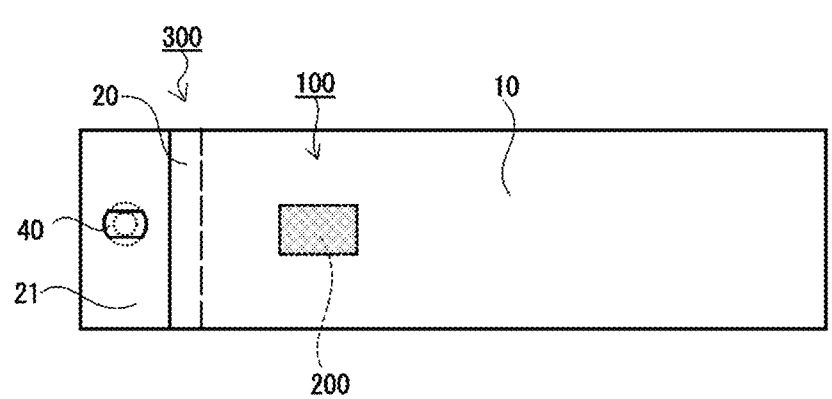
FIG. 17(b) is a schematic plan view of the boost antenna of the second aspect viewed from the radiation unit side.

FIG. 17(a) is a schematic side view of the boost antenna 100 according to a second aspect and FIG. 17(b) is a schematic plan view of the boost antenna 100 of the second aspect viewed from the radiation unit 10 side.

In the boost antenna 100 described in FIG. 3 and FIG. 4, the radiation unit 10, the short circuit unit 20 and the ground unit 30 are made of conductive materials and integrally formed, whereas in the boost antenna 100 according to the second aspect described in FIG. 17(a) and FIG. 17(b), the radiation unit 10 and the short circuit unit 20 are integrated, but the ground unit 30 is separate from the radiation unit 10 and the short circuit unit 20. That is, a connection part 21 provided in the short circuit unit 20 and the ground unit 30 are connected by a fixing tool. As a connection method, for example, the connection part 21 can be screwed to the ground unit 30 using the mounting hole 40.

In this case, after mounting the RFID tag 200 on the ground unit 30 first, the integrally formed radiation unit 10 and short circuit unit 20 are connected to the ground unit 30 using the connection part 21 provided in the short circuit unit 20, and workability when mounting the RFID tag 200 on the boost antenna 100 thereby improves.

By adopting a long hole that extends in the longitudinal direction of the ground unit 30 for the mounting hole 40, it is possible to slide the connection part 21 in the longitudinal direction of the ground unit 30 and thereby adjust the distance between the short circuit unit 20 and the RFID tag 200. By so doing, even if the resonance frequency of the RFID tag 200 varies from lot to lot, for example, it is possible to tune the resonance frequency of the RFID tag 300 with a boost antenna to a target frequency.

(Boost Antenna 100 of Third Aspect)

Figure 18A:
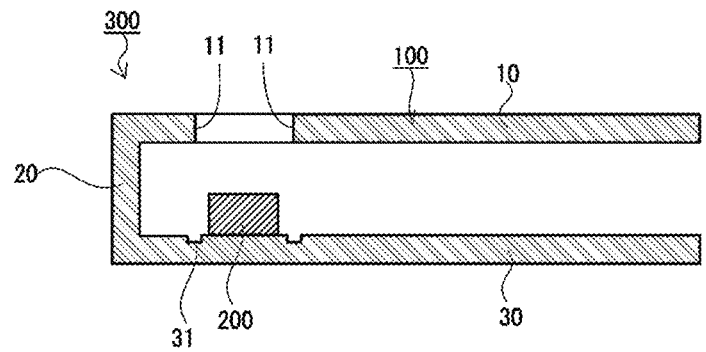
FIG. 18(a) is a schematic cross-sectional view along an A-A' plane in FIG. 18(b) of a boost antenna according to a third aspect.
Figure 18B:
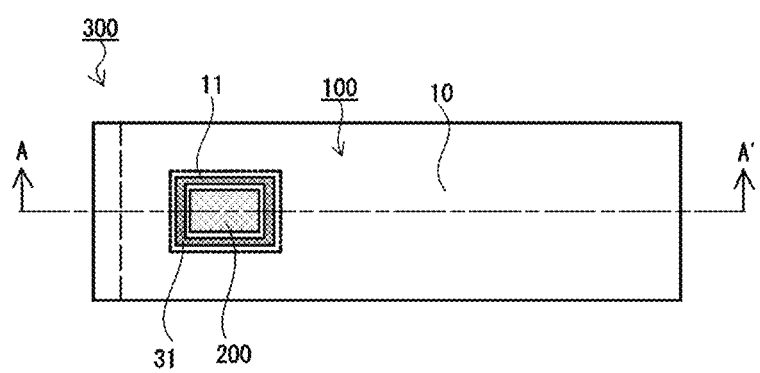
FIG. 18(b) is a schematic plan view of the boost antenna of the third aspect viewed from the radiation unit side.

FIG. 18(a) is a schematic cross-sectional view of the boost antenna 100 of the third aspect along an A-A' plane in FIG. 18(b) and FIG. 18(b) is a schematic plan view of the boost antenna 100 of the third aspect viewed from the radiation unit 10 side.

The boost antenna 100 according to the third aspect described in FIG. 18(a) and FIG. 18(b) are similar to the boost antenna 100 described in FIG. 3 and FIG. 4 in that the radiation unit 10, the short circuit unit 20, and the ground unit 30 are integrally formed. However, in the boost antenna 100 of the third aspect, an opening region 11 through which to allow the RFID tag 200 to pass is formed at a position facing the mounting region of the radiation unit 10 in which the RFID tag 200 is mounted. Note that the opening region 11 is larger in width and length than the mounting region in a plan view. A first groove 31 is provided around the mounting region of the RFID tag 200.

In this case, when mounting the RFID tag 200, it is easier to dispose the RFID tag 200 from the opening region 11 in the mounting region of the ground unit 30.

Forming the first groove 31 around the mounting region makes it easier to recognize the mounting position of the RFID tag 200. Furthermore, by applying an adhesive to the mounting region of the RFID tag 200 and the first groove 31 around the mounting region, it is possible to improve adhesion strength between the RFID tag 200 and the ground unit 30.

Note that though not shown in FIG. 18, the mounting region of the RFID tag 200 may be formed into a convex top surface. In this case, the mounting position of the RFID tag 200 can also be easily recognized.

(Structure of Boost Antenna 100 of Fourth Aspect)

Figure 19A:
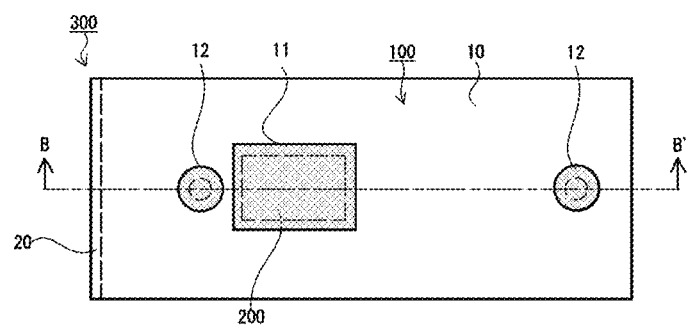
FIG. 19(a) is a schematic plan view of a boost antenna according to a fourth aspect viewed from the radiation unit side.
Figure 19B:
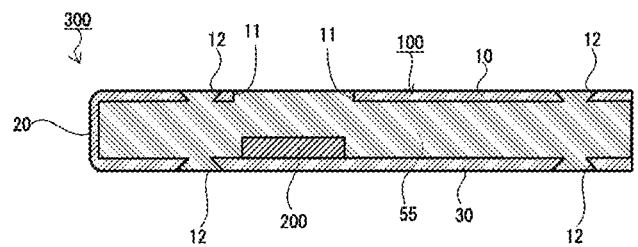
FIG. 19(b) is a schematic cross-sectional view along a B-B' plane in FIG. 19(a) of the boost antenna of the fourth aspect.

FIG. 19(a) is a schematic plan view of the boost antenna 100 according to a fourth aspect viewed from the radiation unit 10 side and FIG. 19(b) is a schematic cross-sectional view of the boost antenna 100 of the fourth aspect along a B-B' plane in FIG. 19(a).

In the boost antenna 100 of the fourth aspect described in FIG. 19(*a*) and FIG. 19(*b*), a space formed between the radiation unit 10 and the ground unit 30 on which the RFID tag 200 is mounted is filled with resin 55. The filling of the resin 55 may be performed after mounting the RFID tag 200 on the ground unit 30 of the boost antenna 100, by charging and then solidifying liquid resin or the like. An opening region 11 and opening holes 12 described in FIG. 19 can be used as injection through holes when liquid resin or the like is charged. Furthermore, when the resin 55 penetrates the opening region 11 and the opening holes 12, the resin 55 strongly engages with the boost antenna 100, and is less likely to come off. Furthermore, as described in FIG. 19(*b*), when the opening holes 12 are filled with the resin 55, this further strengthens the engagement and makes it less likely for the resin 55 to come off. As described in FIG. 19(*b*), when the outside diameter of the opening holes 12 is increased, the engagement becomes stronger against stress in the thickness direction.

In the boost antenna 100 in FIG. 19, the opening region 11 for facilitating the mounting of the RFID tag 200 is provided in the radiation unit 10, and the opening holes 12 are provided in the radiation unit 10 and the ground unit 30. However, the opening region 11 may not be provided. The opening holes 12 may not be provided, or may be provided in the radiation unit 10 only or in the ground unit 30 only.

(Structure of Boost Antenna 100 of Fifth Aspect)

Figure 20A:
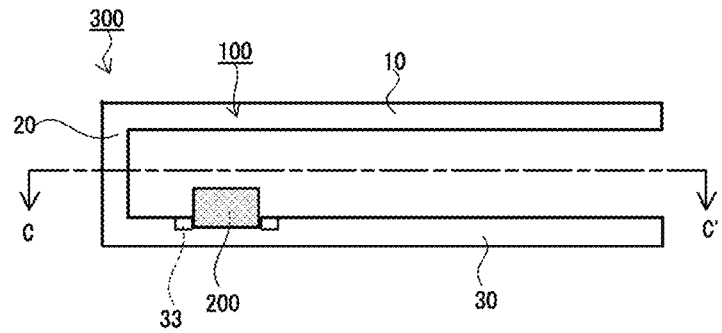
FIG. 20(a) is a schematic side view of a boost antenna according to a fifth aspect and FIG. 20(b) is a schematic cross-sectional view along a C-C' plane in FIG. 20(a) of the boost antenna of the fifth aspect.
Figure 20B:
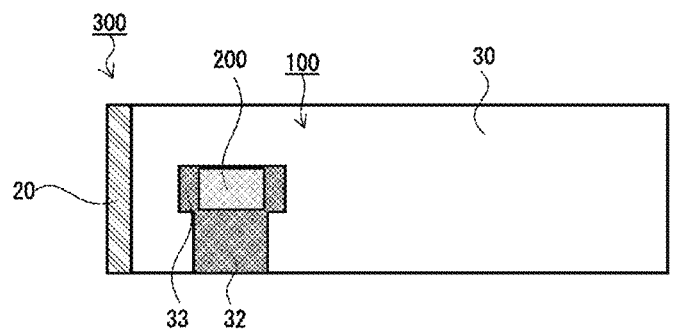

FIG. 20(*a*) is a schematic side view of the boost antenna 100 according to a fifth aspect and FIG. 20(*b*) is a schematic cross-sectional view along a C-C' plane in FIG. 20(*a*) of the boost antenna 100 of the fifth aspect.

The boost antenna 100 according to the fifth aspect described in FIG. 20(*a*) and FIG. 20(*b*) is similar to the boost antenna 100 described in FIG. 3 and FIG. 4 in that the radiation unit 10, the short circuit unit 20 and the ground unit 30 are integrally formed. However, the boost antenna 100 of the fifth aspect includes a second groove 32 formed on an inner surface of a side of the ground unit 30 facing the radiation unit 10, which allows the RFID tag 200 to slide from the side surface in a width direction of the ground unit 30 to the mounting region of the RFID tag 200. In this case, by sliding the RFID tag 200 along the second groove 32, it is possible to easily dispose the RFID tag 200 in the mounting region of the ground unit 30.

Furthermore, a third groove 33 that extends from the mounting region of the RFID tag 200 in the longitudinal direction of the ground unit 30 is formed.

In this case, by sliding the RFID tag 200 disposed in the mounting region along the third groove 33 in the longitudinal direction of the ground unit 30, it is possible to adjust the distance between the RFID tag 200 and the short circuit unit 20 and tune the resonance frequency of the RFID tag 300 with a boost antenna to a target frequency.

Note that though not shown in FIG. 20, when the distance between the RFID tag 200 and the short circuit unit 20 need not be adjusted, only the second groove 32 may be formed in the ground unit 30.

(Structure of Boost Antenna 100 of Sixth Aspect)

Figure 21A:
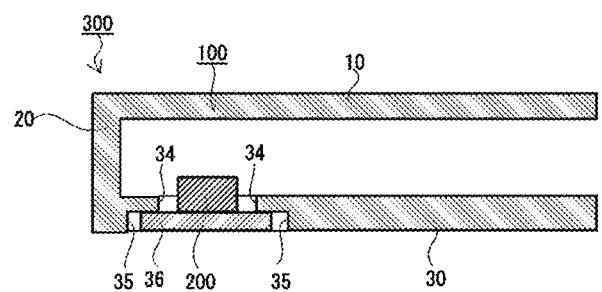
FIG. 21(a) is a schematic cross-sectional view along a D-D' plane in FIG. 21(b) of a boost antenna according to a sixth aspect.
Figure 21B:
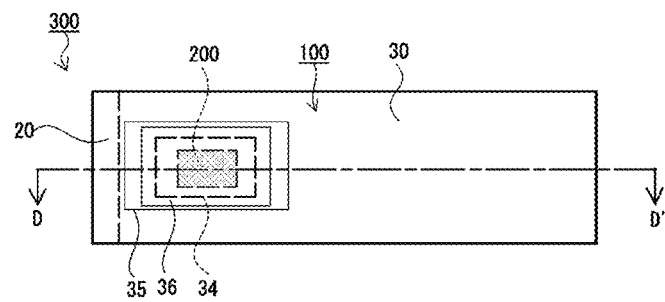
FIG. 21(b) is a schematic plan view of the boost antenna of the sixth aspect viewed from the ground unit side.

FIG. 21(*a*) is a schematic cross-sectional view of the boost antenna 100 according to a sixth aspect along a D-D' plane in FIG. 21(*b*) and FIG. 21(*b*) is a schematic plan view of the boost antenna 100 of the sixth aspect viewed from the ground unit 30 side.

The boost antenna 100 according to the sixth aspect described in FIG. 21(*a*) and FIG. 21(*b*) is similar to the boost antenna 100 described in FIG. 3 and FIG. 4 in that the radiation unit 10, the short circuit unit 20 and the ground unit 30 are integrally formed. However, the boost antenna 100 of the sixth aspect is further provided with a mounting unit 36 for mounting the RFID tag 200, made of a conductive material and formed separately. A through hole 34, which is larger in width and length than the RFID tag 200 in a plan view, is formed in the mounting region of the RFID tag 200 of the ground unit 30, and a notch 35 is formed on an outer surface around the through hole 34 of the ground unit 30. In the boost antenna 100 of the sixth aspect, by bonding the mounting unit 36 on which the RFID tag 200 is mounted to the notch 35 of the ground unit 30, the RFID tag 200 is mounted on the boost antenna 100.

In the boost antenna 100 of the sixth aspect, the length of the notch 35 in the longitudinal direction of the ground unit 30 is made longer than the length of the mounting unit 36, a certain gap is provided between an end of the mounting unit 36 and an end of the notch 35 so that when the mounting unit 36 and the notch 35 are bonded together, the mounting unit 36 is allowed to slide in the longitudinal direction of the ground unit 30.

In this case, the mounting unit 36 on which the RFID tag 200 is mounted can be attached from an outer surface of the ground unit 30, and workability in mounting the RFID tag 200 improves.

When bonding the mounting unit 36 and the notch 35 together, by sliding the mounting unit 36 in the longitudinal direction of the ground unit 30, it is possible to adjust the distance between the RFID tag 200 and the short circuit unit 20 and tune the resonance frequency of the RFID tag 300 with a boost antenna to a target.

Note that though not shown in FIG. 21, when the distance between the RFID tag 200 and the short circuit unit 20 need not be adjusted, the length of the notch 35 in the longitudinal direction of the ground unit 30 and the length of the mounting unit 36 may be set on the same level.

(Structure of Boost Antenna 100 of Seventh Aspect)

Figure 22A:
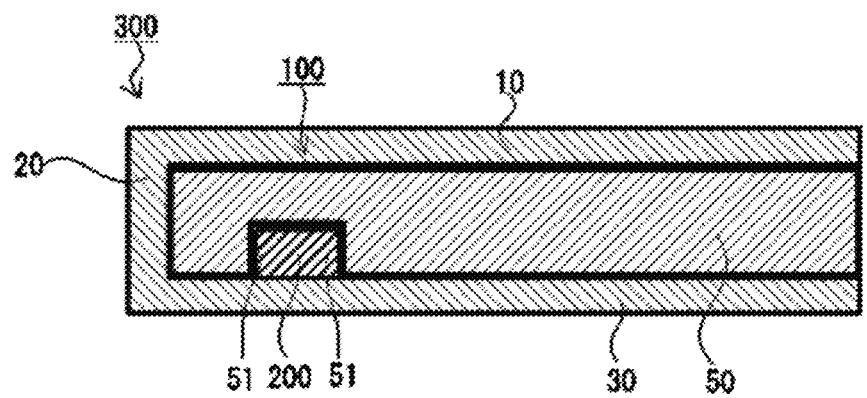
FIG. 22(a) is a schematic cross-sectional view along an E-E' plane in FIG. 22(b) of a boost antenna according to a seventh aspect.

FIG. 22(*a*) is a schematic cross-sectional view of a boost antenna 100 according to a seventh aspect along a E-E' plane in FIG. 22(*b*) and FIG. 22(*b*) is a schematic plan view of the boost antenna 100 of the seventh aspect viewed from the ground unit 30 side and FIG. 22(*c*) is a schematic plan view when a plurality of pockets 51 in FIG. 22(*b*) are formed so as to overlap each other. The boost antenna 100 according to the seventh aspect described in FIG. 22(*a*) and FIG. 22(*b*) is similar to the boost antenna 100 described in FIG. 3 and FIG. 4 in that the radiation unit 10, the short circuit unit 20 and the ground unit 30 are integrally formed. It is also described in the boost antenna 100 of the first aspect, that an insulating support member 50 having a high relative permittivity is inserted between the radiation unit 10 and the ground unit 30 of the boost antenna 100 to thereby shorten the effective wavelength of a radio wave and reduce the shape of the boost antenna 100 with respect to the same resonance frequency. However, in the boost antenna 100 of the first aspect, the insulating support member 50 and the short circuit unit 20 are not in contact with each other, whereas the boost antenna 100 of the seventh aspect is different in that one end portion of the insulating support member 50 is in contact with the short circuit unit 20. In the boost antenna 100 of the first aspect, the RFID tag 200 is not in contact with the insulating support member 50, whereas the boost antenna 100 of the seventh aspect is different in that the insulating support member 50 includes the pockets 51 for positioning the RFID tag 200, and the RFID tag 200 is stored in the pocket 51.

In this case, the RFID tag 200 can be disposed at a predetermined position by storing the RFID tag 200 in the pocket 51 of the insulating support member 50, then inserting the insulating support member 50 in a space of the boost antenna 100 and bring the insulating support member 50 into contact with the short circuit unit 20. This improves workability in mounting the RFID tag 200 on the boost antenna 100.

The number of pockets 51 of the insulating support member 50 may be one or plural. As described in FIG. 22(b), when a plurality of pockets 51 with different distances from the short circuit unit 20 are provided, by selecting a pocket 51 to store the RFID tag 200, it is possible to easily adjust the distance of the RFID tag 200 from the short circuit unit 20 and tune the resonance frequency of the RFID tag 300 with a boost antenna to a target.

Figure 22B:
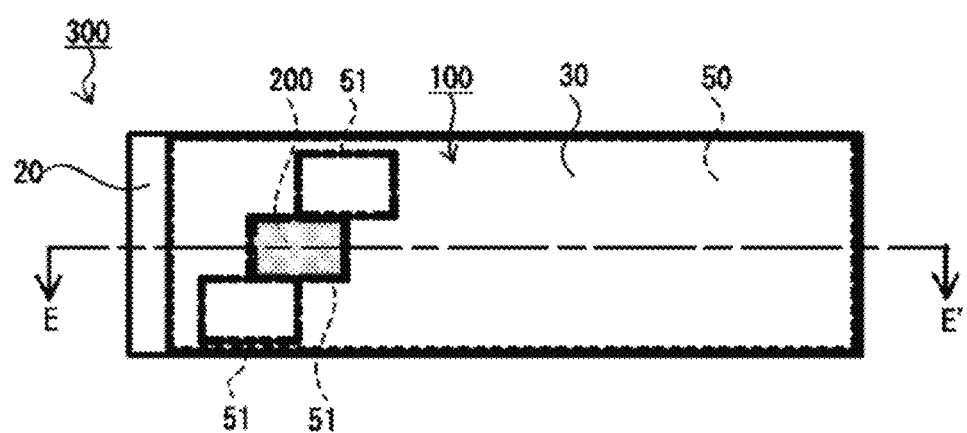
FIG. 22(b) is a schematic plan view of the boost antenna of the seventh aspect viewed from the ground unit side.

When a plurality of pockets 51 with different distances from the short circuit unit 20 are provided as described in FIG. 22(b), a plurality of RFID tags 200 can be stored in the plurality of pockets 51. When the plurality of RFID tags 200 with different distances from the short circuit unit 20 are stored in the plurality of pockets 51, resonance frequencies formed by each RFID tag 200 and the boost antenna 100 differ, and so the RFID tag 300 with a boost antenna can be provided with a plurality of different resonance frequencies and it is possible to support wider band communication frequencies.

Figure 22C:
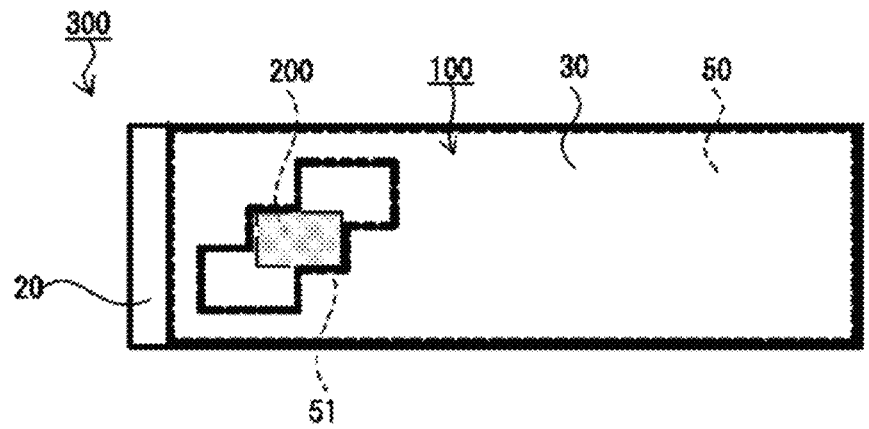
FIG. 22(c) is a schematic plan view when a plurality of pockets in FIG. 22(b) are formed so as to overlap each other.

Note that when only one RFID tag 200 is stored in the plurality of pockets 51, the plurality of pockets 51 may be formed so as to overlap each other as described in FIG. 22(c).

(Structure of Boost Antenna 100 of Eighth Aspect)

Figure 23A:
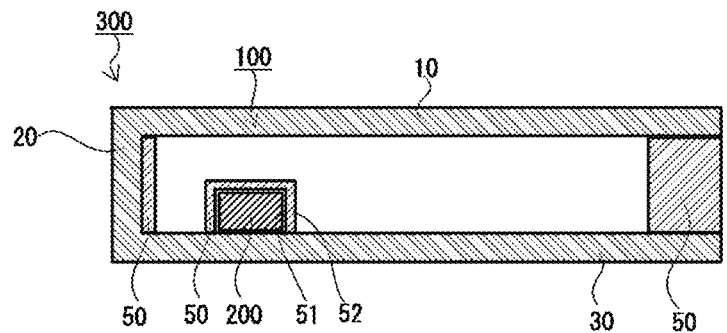
FIG. 23(a) is a schematic cross-sectional view along an F-F' plane in FIG. 23(b) of a boost antenna according to an eighth aspect.
Figure 23B:
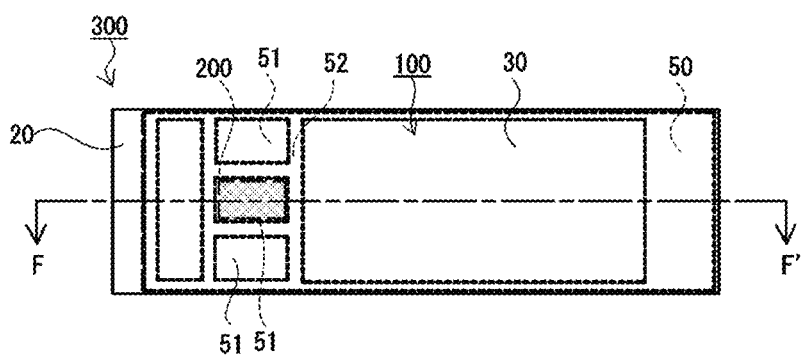
FIG. 23(b) is a schematic plan view of the boost antenna of the eighth aspect viewed from the ground unit side.

FIG. 23(a) is a schematic cross-sectional view of a boost antenna 100 according to an eighth aspect along an F-F' plane in FIG. 23(b) and FIG. 23(b) is a schematic plan view of the boost antenna 100 of the eighth aspect viewed from the ground unit 30 side.

The boost antenna 100 according to the eighth aspect described in FIG. 23(a) and FIG. 23(b) is similar to the boost antenna 100 in FIG. 22 in that the radiation unit 10, the short circuit unit 20 and the ground unit 30 are integrally formed, the insulating support member 50 is inserted in a space formed between the radiation unit 10 and the ground unit 30, one end portion of the insulating support member 50 is in contact with the short circuit unit 20, and a plurality of pockets 51 for positioning the RFID tag 200 are provided. However, the boost antenna 100 of the seventh aspect is different in that the insulating support member 50 is formed only around both ends in the longitudinal direction of the ground unit 30, around both ends in the width direction, and around the pocket 51. That is, the insulating support member 50 is a frame body, includes a support unit 52 that connects the frame body in the width direction of the ground unit 30 and the pockets 51 are provided on the ground unit 30 side of the support unit 52.

The wavelength of a radio wave is proportional to the reciprocal of the square root of a relative permittivity. Therefore, filling the space between the radiation unit 10 and the ground unit 30 with the insulating support member 50 having a large relative permittivity shortens the wavelength of the radio wave, and as a result, the boost antenna 100 can be made smaller. However, on the other hand, dielectric loss is caused by filling the space between the radiation unit 10 and the ground unit 30 with the insulating support member 50. Thus, in the boost antenna 100 of the eighth aspect the insulating support member 50 is filled only at the opening end side, the short circuit unit 20 side, the portion facing both ends in the width direction of the ground unit 30, and around the pockets 51 in which the RFID tag 200 is stored.

Filling the insulating support member 50 at the opening end side is better as the position of dielectric for miniaturization. Filling the insulating support member 50 at the short circuit unit 20 side is better for positioning the pockets 51 and the RFID tag 200. This is intended to miniaturize the boost antenna 100, minimize induction loss by the insulating support member 50, and protect the tag with the insulating support member 50.

Note that in the case of the insulating support member 50 in FIG. 22, the entire space between the radiation unit 10 and the ground unit 30 is filled with the insulating support member 50, whereas a region without any insulating support member 50 may be provided in part of the space between the radiation unit 10 and the ground unit 30 as in the case of the insulating support member 50 in FIG. 23.

In the case of the insulating support member 50 having the shapes in FIG. 22(b) and FIG. 23(b), a plurality of RFID tags 200 can be stored in the plurality of pockets 51. When the plurality of stored RFID tags 200 are each provided with a memory, the reader/writer of the RFID tag 300 with a boost antenna specifies which RFID tag 200 memory to read from or which RFID tag 200 memory to write to, and thereby allows the RFID tag 300 with a boost antenna to function as the RFID tag 300 with a boost antenna having a large memory capacity that sums up memories of the plurality of RFID tags 200.

Second Embodiment

A conductor 350 provided with an RFID tag with a boost antenna according to a second embodiment includes the RFID tag 300 with a boost antenna according to the first embodiment fixed to the conductor 310.

The conductor 350 provided with the RFID tag with a boost antenna according to the second embodiment is described in FIG. 1 and FIG. 2.

Examples of the conductor 310 include various metal objects requiring use histories when used, devices like jigs or tools used for various industrial processes such as machining, metal working, resin processing. Such devices include consumable ones such as cutting or polishing devices as well. Examples of the conductor 310 include not only industrial devices but also objects with metal surfaces such as daily necessities for household use, agricultural products, various prepaid cards for transportation facilities, or medical equipment.

When fixing the RFID tag 300 with a boost antenna to the conductor 310, the ground unit 30 of the boost antenna 100 may be grounded to the conductor 310. When the ground unit 30 is grounded to the conductor 310, the conductor 310 functions as an extension of the ground unit 30 of the RFID tag 300 with a boost antenna, which improves antenna gain and improves the communication distance of the RFID tag 300 with a boost antenna. As a method for grounding the ground unit 30 to the conductor 310, in addition to directly grounding the ground unit 30 to the conductor 310, the ground unit 30 may be electrically grounded via a capacitance of an adhesive layer or the like.

Note that when the RFID tag 300 with a boost antenna is fixed to a rectangular conductor 310, the short circuit unit 20 of the boost antenna 100 may be disposed in the vicinity of one side of the conductor 310 as described in FIG. 2. Furthermore, the radiation unit 10 of the boost antenna 100 may be disposed in the vicinity of another side adjacent to the one side of the conductor 310 so that the Y direction of the radiation unit 10 is parallel to the another side. Such placement allows the RFID tag 300 with a boost antenna to improve the communication distance thereof.

Third Embodiment

An RFID system 400 with a boost antenna according to a third embodiment combines: the RFID tag 300 with a boost antenna of the first embodiment and an RFID reader/writer 410 including an antenna 420 that transmits/receives a radio wave. The RFID system 400 communicates with each other and makes information to be recorded in the RFID tag 200 rewritable at any time.

Figure 24:
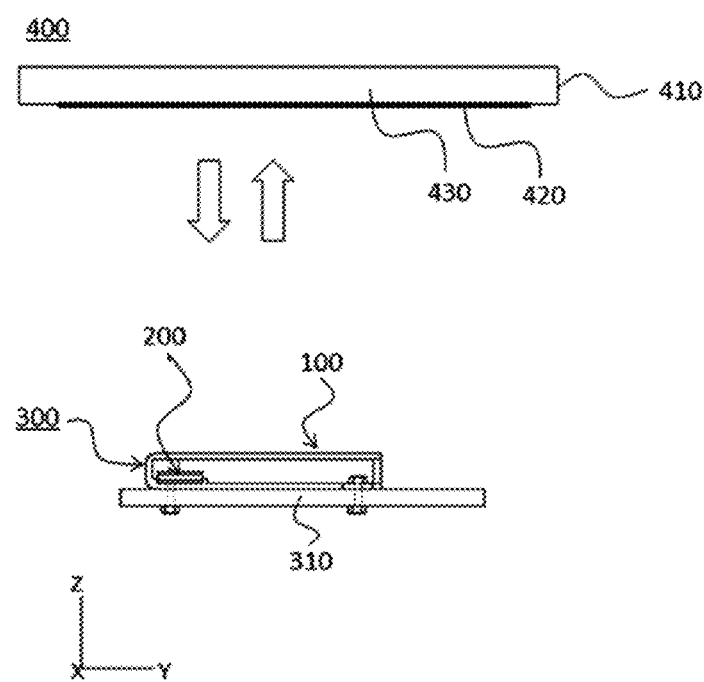
FIG. 24 is a diagram illustrating a configuration of an RFID system with a boost antenna.

A configuration of the RFID system 400 with a boost antenna of the third embodiment is shown in FIG. 24. The RFID tag 300 with a boost antenna is identical to the RFID tag 300 with a boost antenna described in FIG. 1 and FIG. 2. The RFID reader/writer 410 includes an antenna 420 that transmits/receives a radio wave to/from the RFID tag 300 with a boost antenna. The RFID reader/writer 410 is, for example, formed by providing the rectangular antenna 420 on a substrate 430 made of an electric insulating material. The substrate 430 may be a housing (not shown) that stores the antenna 420.

With the RFID tag 200 disposed on the boost antenna 100, the RFID system 400 with a boost antenna of the third embodiment can improve the communication distance significantly.

In the present disclosure, the boost antenna 100 corresponds to a "boost antenna," the RFID tag 200 corresponds to a "RFID tag," the RFID tag 300 with a boost antenna corresponds to a "RFID tag with a boost antenna," the radiation unit 10 corresponds to a "radiation unit," the short circuit unit 20 corresponds to a "short circuit unit," the ground unit 30 corresponds to a "ground unit," the ground plate 220 corresponds to a "ground plate," the radiation plate 210 corresponds to a "radiation plate," the conductor 310 corresponds to a "conductor," the protrusion 70 corresponds to a "protrusion," the connection part 21 corresponds to a "connection part," the opening region 11 corresponds to an "opening region," the opening hole 12 corresponds to an "opening hole," the resin 55 corresponds to "resin," the first groove 31 corresponds to a "first groove," the second groove 32 corresponds to a "second groove," the third groove 33 corresponds to a "third groove," the mounting unit 36 corresponds to a "mounting unit," the through hole 34 corresponds to a "through hole," the notch 35 corresponds to a "notch," the insulating support member 50 corresponds to an "insulating support member," the pocket 51 corresponds to a "pocket," the support unit 52 corresponds to a "support unit," the insulating substrate 230 corresponds to an "insulating substrate," the IC chip 240 corresponds to an "IC chip," the capacity part conductor 250 corresponds to a "capacity part conductor," the short circuit conductor 260 corresponds to a "short circuit conductor," the capacity part penetrating conductor 270 corresponds to a "capacity part penetrating conductor," the conductor 350 provided with an RFID tag with a boost antenna corresponds to a "conductor provided with an RFID tag with a boost antenna," the RFID system 400 with a boost antenna corresponds to an "RFID system with a boost antenna," the RFID reader/writer 410 corresponds to an "RFID reader/writer," and the antenna 420 for an RFID reader/writer corresponds to an "antenna."

Although the embodiments of the present disclosure are as described above, the present disclosure is not limited to the embodiments only. It will be understood that various other embodiments can be implemented without departing from the spirit and scope of the present disclosure. Furthermore, although operations and effects according to the configuration of the present disclosure have been described in the present embodiments, these operations and effects are examples and not intended to limit the present disclosure.

REFERENCE SIGNS LIST 10 radiation unit
11 opening region
12 opening hole
20 short circuit unit
21 connection part
30 ground unit
31 first groove
32 second groove
33 third groove
34 through hole
35 notch
36 mounting unit
40 mounting hole
50 insulating support member
51 pocket
52 support unit
55 resin
60 dielectric substrate
70 protrusion
80 metal fitting
90 power supply unit
100 boost antenna
200 RFID tag
210 radiation plate
220 ground plate
230 insulating substrate
240 IC chip
250 capacity part conductor
260 short circuit conductor
270 capacity part penetrating conductor
300 RFID tag with boost antenna
310 conductor
350 conductor provided with RFID tag with boost antenna
400 RFID system with boost antenna
410 RFID reader/writer
420 antenna
430 substrate

What is claimed is:
1. An RFID tag device comprising:
an RFID tag; and
a boost antenna, the boost antenna comprising:
   a radiation unit that is conductive;
   a ground unit that is conductive and faces the radiation unit; and
   a short circuit unit that connects one end of the radiation unit and one end of the ground unit, and electrically conducts the radiation unit and the ground unit to each other,
the RFID tag is disposed between the radiation unit and the ground unit of the boost antenna and at a position closer to the short circuit unit than to a center position in a longitudinal direction of the radiation unit,
the boost antenna and the RFID tag each have resonance characteristics,
wherein the radiation unit, the short circuit unit, and the ground unit are integrated,
the ground unit comprises a mounting region of the RFID tag on an inner surface on an opposite side facing the radiation unit, and the radiation unit comprises an opening region larger in width and length in a plan view than the mounting region at a position facing the mounting region.

2. The RFID tag device according to claim 1, wherein a space formed between the radiation unit and the ground unit on which the RFID tag is mounted is filled with resin.

3. An RFID tag device comprising:
an RFID tag; and
a boost antenna, the boost antenna comprising:
　a radiation unit that is conductive;
　a ground unit that is conductive and faces the radiation unit; and
　a short circuit unit that connects one end of the radiation unit and one end of the ground unit, and electrically conducts the radiation unit and the ground unit to each other,
the RFID tag is disposed between the radiation unit and the ground unit of the boost antenna and at a position closer to the short circuit unit than to a center position in a longitudinal direction of the radiation unit,
the boost antenna and the RFID tag each have resonance characteristics,
the radiation unit, the short circuit unit, and the ground unit are integrated,
the boost antenna further comprising a separate mounting unit made of a conductive material for mounting the RFID tag, wherein
the ground unit further comprises:
　a through hole which is larger in width and length in a plan view than the RFID tag, and
　a notch located on an outer surface around the through hole, and the separate mounting unit engages with the notch.

4. The RFID tag device according to claim 3, wherein the length of the notch in a longitudinal direction of the ground unit is longer than the length of the separate mounting unit.

5. An RFID tag device comprising:
an RFID tag; and
a boost antenna, the boost antenna comprising:
　a radiation unit that is conductive;
　a ground unit that is conductive and faces the radiation unit; and
　a short circuit unit that connects one end of the radiation unit and one end of the ground unit, and electrically conducts the radiation unit and the ground unit to each other,
the RFID tag is disposed between the radiation unit and the ground unit of the boost antenna and at a position closer to the short circuit unit than to a center position in a longitudinal direction of the radiation unit,
the boost antenna and the RFID tag each have resonance characteristics in the UHF frequency band,
wherein the RFID tag is an inverted-F antenna type RFID tag, the RFID tag comprising:
　an insulating substrate,
　a radiation plate provided on a top surface of the insulating substrate,
　a ground plate provided on an undersurface of the insulating substrate,
　a short circuit conductor connected to the radiation plate and the ground plate, and
　an IC chip connected to the radiation plate and the ground plate, and
the RFID tag is disposed so that the short circuit conductor is located on a side farthest from the short circuit unit or on a side closest to the short circuit unit.

6. The RFID tag device according to claim 5, wherein the short circuit unit, the radiation unit, and the ground unit have a same width and the short circuit unit has a rectangular parallelepiped shape.

7. The RFID tag device according to claim 5, wherein the radiation unit, the short circuit unit, and the ground unit are integrated.

8. The RFID tag device according to claim 5, wherein the short circuit unit is constructed of at least one post.

9. The RFID tag device according to claim 5, wherein the ground unit comprises a protrusion for positioning the RFID tag.

10. The RFID tag device according to claim 5, wherein the ground unit comprises a fixing tool to fix the RFID tag.

11. The RFID tag device according to claim 5, wherein
　the radiation unit and the short circuit unit are integrated,
　the ground unit is separate from the radiation unit and the short circuit unit,
　the RFID tag is mounted on the ground unit, and
　a connection part provided in the short circuit unit is connected to the ground unit.

12. The RFID tag device according to claim 11, wherein the connection part and the ground unit are slidably connected in a longitudinal direction of the ground unit.

13. The RFID tag device according to claim 5, wherein the RFID tag device is configured to adjust a resonance frequency of the boost antenna, a resonance frequency of the RFID tag, and a coupling coefficient between the boost antenna and the RFID tag to enable transmission and reception at two different frequencies.

14. The RFID tag device according to claim 5, wherein the RFID tag device is configured to adjust a resonance frequency of the boost antenna, a resonance frequency of the RFID tag and a coupling coefficient between the boost antenna and the RFID tag, and widen a transmission/reception frequency band.

15. The RFID tag device according to claim 5, wherein an insulating support member is inserted in a space formed between the radiation unit and the ground unit.

16. The RFID tag device according to claim 15, wherein one end of the insulating support member contacts the short circuit unit and the insulating support member comprises at least one pocket for positioning the RFID tag.

17. The RFID tag device according to claim 5, wherein the RFID tag is disposed so that the short circuit conductor is located on the side farthest from the short circuit unit.

18. A conductor comprising an RFID tag device, wherein
　the RFID tag device according to claim 5 is fixed to a surface of the conductor and
　the ground unit of the boost antenna and the surface of the conductor are electrically connected directly or via a capacitance.

19. An RFID system comprising:
the RFID tag device according to claim 5; and
an RFID reader/writer comprising an antenna that transmits and receives a radio wave to and from the RFID tag device.

* * * * *